United States Patent
Ito et al.

(10) Patent No.: US 11,812,142 B2
(45) Date of Patent: Nov. 7, 2023

(54) INFORMATION PROCESSING APPARATUS, IMAGING APPARATUS, IMAGING SYSTEM, CONTROL METHOD OF INFORMATION PROCESSING APPARATUS, CONTROL METHOD OF IMAGING APPARATUS, AND PROGRAM

(71) Applicant: Sony Corporation, Tokyo (JP)

(72) Inventors: Ryogo Ito, Tokyo (JP); Shiro Eshita, Tokyo (JP); Megumi Takagi, Kanagawa (JP); Kazuma Akamatsu, Tokyo (JP); Ayumi Yamamoto, Tokyo (JP)

(73) Assignee: Sony Group Corporation, Tokyo (JP)

( * ) Notice: Subject to any disclaimer, the term of this patent is extended or adjusted under 35 U.S.C. 154(b) by 21 days.

(21) Appl. No.: 14/911,133

(22) PCT Filed: Jul. 24, 2014

(86) PCT No.: PCT/JP2014/069548
§ 371 (c)(1),
(2) Date: Feb. 9, 2016

(87) PCT Pub. No.: WO2015/052975
PCT Pub. Date: Apr. 16, 2015

(65) Prior Publication Data
US 2016/0198080 A1 Jul. 7, 2016

(30) Foreign Application Priority Data
Oct. 7, 2013 (JP) .................................. 2013-210119

(51) Int. Cl.
*H04N 23/661* (2023.01)
*H04N 23/63* (2023.01)
(Continued)

(52) U.S. Cl.
CPC ......... *H04N 23/661* (2023.01); *H04N 23/631* (2023.01); *H04N 23/633* (2023.01);
(Continued)

(58) Field of Classification Search
CPC ........... H04N 5/23203; H04N 5/23206; H04N 5/23209; H04N 5/2254; H04N 5/2253;
(Continued)

(56) References Cited

U.S. PATENT DOCUMENTS

| | | | |
|---|---|---|---|
| 6,188,431 B1 * | 2/2001 | Oie | H04N 1/2112 |
| | | | 348/14.14 |
| 8,369,701 B2 * | 2/2013 | Kashiwa | H04N 5/232 |
| | | | 396/325 |

(Continued)

FOREIGN PATENT DOCUMENTS

| | | |
|---|---|---|
| CN | 1271233 A | 10/2000 |
| CN | 101567974 A | 10/2009 |

(Continued)

OTHER PUBLICATIONS

U.S. Appl. No. 61/732,314, filed Dec. 2012, Galor; Micha.*

(Continued)

*Primary Examiner* — Twyler L Haskins
*Assistant Examiner* — Akshay Trehan
(74) *Attorney, Agent, or Firm* — Michael Best & Friedrich LLP

(57) ABSTRACT

An appropriate user interface corresponding to a use state of an apparatus is provided.
An imaging system includes an imaging apparatus and an information processing apparatus. The imaging apparatus has a control related to an imaging operation performed based on an operation input performed in the information processing apparatus by connecting to the information processing apparatus by using wireless communication. The (Continued)

information processing apparatus performs a control for switching a display state of a display screen related to an imaging operation of the imaging apparatus, based on a connection number of imaging apparatuses and information processing apparatuses connected by using wireless communication.

7 Claims, 14 Drawing Sheets

(51) Int. Cl.
    *H04N 23/667*    (2023.01)
    *H04N 23/54*     (2023.01)
    *G03B 17/14*     (2021.01)
    *H04M 1/02*      (2006.01)
    *H04N 23/55*     (2023.01)
    *H04N 1/00*      (2006.01)

(52) U.S. Cl.
    CPC ......... *H04N 23/662* (2023.01); *H04N 23/667* (2023.01); *G03B 17/14* (2013.01); *H04M 1/0264* (2013.01); *H04N 1/00411* (2013.01); *H04N 23/54* (2023.01); *H04N 23/55* (2023.01)

(58) Field of Classification Search
    CPC ........... H04N 5/23293; H04N 5/23216; H04N 5/23245; H04N 1/00411; H04N 5/232933; H04N 23/62; H04N 23/63; H04N 23/631; H04N 23/632; H04N 23/633; H04N 23/634; H04N 23/635; H04N 23/66; H04N 23/661; H04N 23/662; H04N 23/663; H04N 23/665; H04N 23/667; H04N 23/54; H04N 23/55; H04N 1/00408; H04N 1/00413; H04M 1/026; H04M 1/0264; H04M 1/0254; G03B 17/12; G03B 17/14; G06F 3/0416; G06F 3/0488; G06F 3/04886; G06F 3/0482; G06F 3/048
    See application file for complete search history.

(56) References Cited

U.S. PATENT DOCUMENTS

| | | | | |
|---|---|---|---|---|
| 8,854,484 B2 * | 10/2014 | Takagi | .................. | H04N 23/631 348/211.3 |
| 9,462,249 B2 * | 10/2016 | Goldberg | ............ | G06F 3/04883 |
| 2003/0160870 A1 * | 8/2003 | Ziemkowski | .......... | H04N 5/232 348/207.99 |
| 2004/0183915 A1 * | 9/2004 | Gotohda | ................ | H04N 23/63 348/E5.042 |
| 2006/0165405 A1 * | 7/2006 | Kanai | ..................... | H04N 23/66 386/E5.072 |
| 2006/0171695 A1 * | 8/2006 | Jung | ..................... | G06T 3/4023 396/56 |
| 2009/0009605 A1 * | 1/2009 | Ortiz | ..................... | H04N 5/232 348/157 |
| 2009/0096877 A1 * | 4/2009 | Kunishige | ............... | G03B 17/14 348/207.11 |
| 2010/0271490 A1 * | 10/2010 | Jung | ........................ | H04L 9/32 348/207.1 |
| 2011/0050925 A1 * | 3/2011 | Watanabe | .............. | H04N 23/66 348/E5.043 |
| 2011/0085016 A1 * | 4/2011 | Kristiansen | ............ | H04N 23/62 345/173 |
| 2012/0307091 A1 * | 12/2012 | Yumiki | .................. | H04N 23/66 348/E5.042 |
| 2013/0182138 A1 * | 7/2013 | Cho | .................... | H04N 1/32106 348/211.3 |
| 2013/0250134 A1 * | 9/2013 | McCauley | ......... | H04N 5/23203 348/211.2 |
| 2014/0160304 A1 * | 6/2014 | Galor | ..................... | H04N 23/66 348/207.1 |
| 2014/0184728 A1 * | 7/2014 | Kwon | ................. | H04L 12/1827 348/14.08 |

FOREIGN PATENT DOCUMENTS

| | | |
|---|---|---|
| JP | 2004-112771 A | 4/2004 |
| JP | 2009-094591 A | 4/2009 |
| JP | 2013-013063 A | 1/2013 |
| JP | 2013-093822 A | 5/2013 |

OTHER PUBLICATIONS

Extended European Search Report dated Feb. 16, 2017 for corresponding European Application No. 14852381.4.
Chinese Office Action dated Aug. 2, 2018 for corresponding Chinese Application No. 201480054225.3.
Japanese Office Action dated Sep. 11, 2018 for corresponding Japanese Application No. 2015-541461.
Chinese Office Action dated Apr. 3, 2019 for corresponding Chinese Application No. 201480054225.3.

* cited by examiner a b a b

DISPLAY EXAMPLE OF CASE WHERE ONE INFORMATION PROCESSING APPARATUS IS CONNECTED TO ONE IMAGING APPARATUS

DISPLAY EXAMPLE OF CASE WHERE PLURALITY OF INFORMATION PROCESSING APPARATUSES ARE CONNECTED TO ONE IMAGING APPARATUS

DISPLAY EXAMPLE OF INFORMATION PROCESSING APPARATUS HAVING OPERATION RIGHT AND LIVE VIEW RIGHT a

DISPLAY EXAMPLE OF INFORMATION PROCESSING APPARATUS HAVING ONLY LIVE VIEW RIGHT WITHOUT OPERATION RIGHT b a b

INFORMATION PROCESSING APPARATUS, IMAGING APPARATUS, IMAGING SYSTEM, CONTROL METHOD OF INFORMATION PROCESSING APPARATUS, CONTROL METHOD OF IMAGING APPARATUS, AND PROGRAM

TECHNICAL FIELD

The present technology relates to an information processing apparatus and an imaging apparatus. In detail, it relates to an information processing apparatus, an imaging apparatus, and an imaging system which perform a control related to an imaging operation, control methods of these, and programs for causing these methods to be executed by a computer.

BACKGROUND ART

In related art, imaging apparatuses such as digital still cameras and digital video cameras (for example, a camera-integrated recorder) are widespread, which generate an image (image data) by capturing a photographic subject, and record this image as a content. Further, wireless communication technology exists where an exchange of various types of data is performed by using wireless communication.

Further, technology exists where an imaging apparatus is operated by another apparatus by using wireless communication. For example, an electronic device has been proposed, when a contact operation is detected for an operation switch image displayed in a display unit, for causing an operation, which corresponds to the operation switch image for which this contact operation is performed, to be executed in an imaging apparatus (for example, refer to Patent Literature 1).

CITATION LIST

Patent Literature

Patent Literature 1: JP 2009-94591A

SUMMARY OF INVENTION

Technical Problem

In the above described related art, since an imaging apparatus can be operated by an electronic device by using wireless communication, the imaging apparatus can be operated by using the electronic device, for example, even in the case where the imaging apparatus and the electronic device are separated.

Here, for example, it is assumed to be a case where one imaging apparatus and a plurality of information processing apparatuses are connected by using wireless communication, or a case where a plurality of imaging apparatuses and one information processing apparatus are connected by using wireless communication. In these cases, since the use states of an imaging apparatus and an information processing apparatus are different, it will be important to provide an appropriate user interface in accordance with these use states.

The present technology is created by considering such a situation, and an object of the present technology is to provide an appropriate user interface corresponding to a use state of an apparatus.

Solution to Problem

The present technology is created to solve the above-described problem. A first aspect of the present technology is an information processing apparatus, a control method thereof, and a program for causing a computer to execute the control method, the information processing apparatus including: a control unit which performs a control for switching a display state of a display screen related to an imaging operation of an imaging apparatus based on a connection number of imaging apparatuses and information processing apparatuses connected by using wireless communication. In this way, an action is brought about for switching a display state of a display screen related to an imaging operation of an imaging apparatus, based on a connection number of imaging apparatuses and information processing apparatuses connected by using wireless communication.

According to the first aspect, the control unit may perform a control for switching a display state of the display screen based on a number of information processing apparatuses connected to the imaging apparatus by using wireless communication. In this way, an action is brought about for switching a display state of a display screen based on a number of information processing apparatuses connected to an imaging apparatus by using wireless communication.

According to the first aspect, the control unit may perform a control, in the case where only the information processing apparatus is connected to the imaging apparatus, for causing the display screen for operating the imaging apparatus to be displayed, and in the case where another information processing apparatus other than the information processing apparatus is connected to the imaging apparatus, for causing the display screen corresponding to a presence or absence of an operation right for operating the imaging apparatus to be displayed. In this way, an action is brought about, in the case where only one information processing apparatus is connected to an imaging apparatus, for causing a display screen for operating the imaging apparatus to be displayed, and in the case where a plurality of information processing apparatuses are connected to an imaging apparatus, for causing a display screen corresponding to a presence or absence of an operation right for operating the imaging apparatus to be displayed.

According to the first aspect, in the case where the information processing apparatus and the other information processing apparatus are connected to the imaging apparatus, the control unit may perform a control for causing the display screen which includes an image generated by the imaging apparatus and an operation object for operating the imaging apparatus to be displayed, at the time when the information processing apparatus has the operation right, and for causing the display screen which includes an image generated by the imaging apparatus to be displayed, at the time when the information processing apparatus does not have the operation right. In this way, an action is brought about, in the case where a plurality of information processing apparatuses are connected to an imaging apparatus, for causing a display screen which includes an image generated by the imaging apparatus and an operation object for operating the imaging apparatus to be displayed, at the time when an information processing apparatuses has an operation right, and for causing a display screen which includes an image generated by the imaging apparatus to be displayed, in the case where an information processing apparatus does not have an operation right.

According to the first aspect, the control unit may perform a control for switching a display state of the display screen based on a number of imaging apparatuses connected to the information processing apparatus by using wireless communication. In this way, an action is brought about for switching a display state of a display screen based on a number of imaging apparatuses connected to an information processing apparatus by using wireless communication.

According to the first aspect, the control unit may perform a control, in the case where only one imaging apparatus is connected to the information processing apparatus, for causing the display screen which includes an image generated by the imaging apparatus and an operation object for operating the imaging apparatus to be displayed, and in the case where a plurality of imaging apparatuses are connected to the information processing apparatus, for causing the display screen which includes an image generated by each of the plurality of imaging apparatuses, an operation object for simultaneously operating the plurality of imaging apparatuses, and an operation object for operating each of the plurality of imaging apparatuses, to be displayed. In this way, an action is brought about, in the case where only one imaging apparatus is connected to an information processing apparatus, for causing a display screen which includes an image generated by this imaging apparatus and an operation object for operating this imaging apparatus to be displayed, and in the case where a plurality of imaging apparatuses are connected to an information processing apparatus, for causing a display screen which includes an image generated by each of the plurality of imaging apparatuses, an operation object for simultaneously operating the plurality of imaging apparatuses, and an operation object for operating each of the plurality of imaging apparatuses, to be displayed.

According to the first aspect, the control unit may perform a control, in the case where an imaging apparatus mounted on the information processing apparatus is present from among the plurality of imaging apparatuses connected to the information processing apparatus, for causing an image generated by the imaging apparatus to be displayed enlarged. In this way, an action is brought about, in the case where an imaging apparatus mounted on an information processing apparatus is present, for causing an image generated by this imaging apparatus to be displayed enlarged.

A second aspect of the present technology is an imaging apparatus, a control method thereof, and a program for causing a computer to execute the control method, the imaging apparatus including: a control unit which performs a control related to an imaging operation based on an operation input using a display screen performed in an information processing apparatus in which the display screen is displayed for a display state to be switched based on a connection number of imaging apparatuses and information processing apparatuses connected by using wireless communication. In this way, an action is brought about where a control related to an imaging operation is performed based on an operation input using a display screen performed in an information processing apparatus in which the display screen is displayed for a display state to be switched based on a connection number of imaging apparatuses and information processing apparatuses connected by using wireless communication.

According to the second aspect, a display state of the display screen may be switched based on a number of information processing apparatuses connected to the imaging apparatus by using wireless communication. In this way, an action is brought about for a display state of a display screen to be switched based on a number of information processing apparatuses connected to an imaging apparatus by using wireless communication.

According to the second aspect, in the case where only one information processing apparatus is connected to the imaging apparatus, the display screen for operating the imaging apparatus may be displayed in the information processing apparatus, and in the case where a plurality of information processing apparatuses are connected to the imaging apparatus, the display screen corresponding to a presence or absence of an operation right for operating the imaging apparatus may be displayed in each of the plurality of information processing apparatuses. In this way, an action is brought about, in the case where only one information processing apparatus is connected to an imaging apparatus, where a display screen for operating the imaging apparatus is displayed in this information processing apparatus, and in the case where a plurality of information processing apparatuses are connected to an imaging apparatus, where a display screen corresponding to a presence or absence of an operation right for operating the imaging apparatus is displayed in each of the plurality of information processing apparatuses.

According to the second aspect, in the case where the plurality of information processing apparatuses are connected to the imaging apparatus, the display screen which includes an image generated by the imaging apparatus and an operation object for operating the imaging apparatus may be displayed in an information processing apparatus having the operation right, and the display screen which includes an image generated by the imaging apparatus may be displayed in an information processing apparatus not having the operation right. In this way, an action is brought about, in the case where a plurality of information processing apparatuses are connected to an imaging apparatus, where a display screen which includes an image generated by the imaging apparatus and an operation object for operating the imaging apparatus is displayed in an information processing apparatus having an operation right, and where a display screen which includes an image generated by the imaging apparatus is displayed in an information processing apparatus not having an operation right.

According to the second aspect, a display state of the display screen may be switched based on a number of imaging apparatuses connected to the information processing apparatus by using wireless communication. In this way, an action is brought about where a display state of a display screen is switched based on a number of imaging apparatuses connected to an information processing apparatus by using wireless communication.

According to the second aspect, in the case where only one imaging apparatus is connected to the information processing apparatus, the display screen which includes an image generated by the imaging apparatus and an operation object for operating the imaging apparatus may be displayed in the information processing apparatus, and in the case where a plurality of imaging apparatuses are connected to the information processing apparatus, the display screen which includes an image generated by each of the plurality of imaging apparatuses, an operation object for simultaneously operating the plurality of imaging apparatuses, and an operation object for operating each of the plurality of imaging apparatuses, may be displayed in the information processing apparatus. In this way, an action is brought about, in the case where only one imaging apparatus is connected to an information processing apparatus, where a display screen which includes an image generated by this imaging apparatus and an operation object for operating this imaging apparatus is displayed in the information processing apparatus, and in the case where a plurality of imaging apparatuses are connected to an information processing apparatus, a display screen which includes an image generated by each of the plurality of imaging apparatuses, an operation object for simultaneously operating the plurality of imaging apparatuses, and an operation object for operating each of the plurality of imaging apparatuses, is displayed in the information processing apparatus.

According to the second aspect, in the case where an imaging apparatus mounted on the information processing apparatus is present from among the plurality of imaging apparatuses connected to the information processing apparatus, an image generated by the imaging apparatus may be displayed enlarged. In this way, an action is brought about, in the case where an imaging apparatus mounted on an information processing apparatus is present, where an image generated by this imaging apparatus is displayed enlarged.

A third aspect of the present technology is an imaging system, a control method thereof, and a program for causing a computer to execute the control method, the imaging system including: an imaging apparatus in which a control related to an imaging operation is performed based on an operation input performed in an information processing apparatus by connecting to the information processing apparatus by using wireless communication; and an information processing apparatus which performs a control for switching a display state of a display screen related to an imaging operation of the imaging apparatus based on a connection number of the imaging apparatuses and the information processing apparatuses connected by using wireless communication. In this way, an action is brought about where an imaging apparatus has a control related to an imaging operation performed based on an operation input performed in an information processing apparatus by connecting to the information processing apparatus by using wireless communication, and the information processing apparatus switches a display state of a display screen related to an imaging operation of the imaging apparatus based on a connection number of imaging apparatuses and information processing apparatuses connected by using wireless communication.

Advantageous Effects of Invention

The present technology can accomplish a superior effect such as being able to provide an appropriate user interface corresponding to a use state of an apparatus. Note that, the effect described here is not necessarily limited, and may be any effect described within the present disclosure.

DESCRIPTION OF EMBODIMENTS

Hereinafter, the modes for executing the present technology (hereinafter, called the embodiments) will be described. Note that, the description will be given in the following order.

1. First embodiment (example where a display state of a display screen is switched based on the number of information processing apparatuses connected to one imaging apparatus)

2. Second embodiment (example where a display state of a display screen is switched based on the number of imaging apparatuses connected to one information processing apparatus)

1. First Embodiment

[External Appearance Configuration of the Imaging Apparatus]

Figure 1:
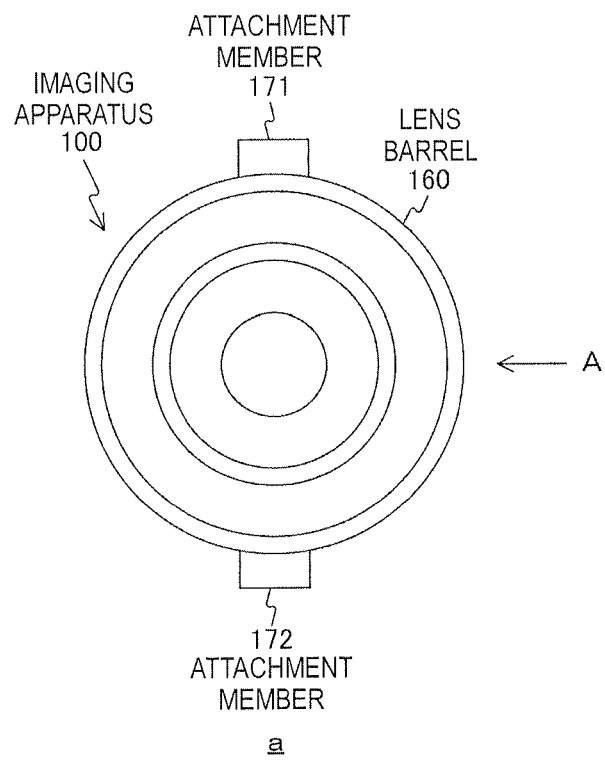
FIG. 1 is a figure which shows an external appearance configuration of an imaging apparatus 100 in a first embodiment of the present technology.
Figure 1:
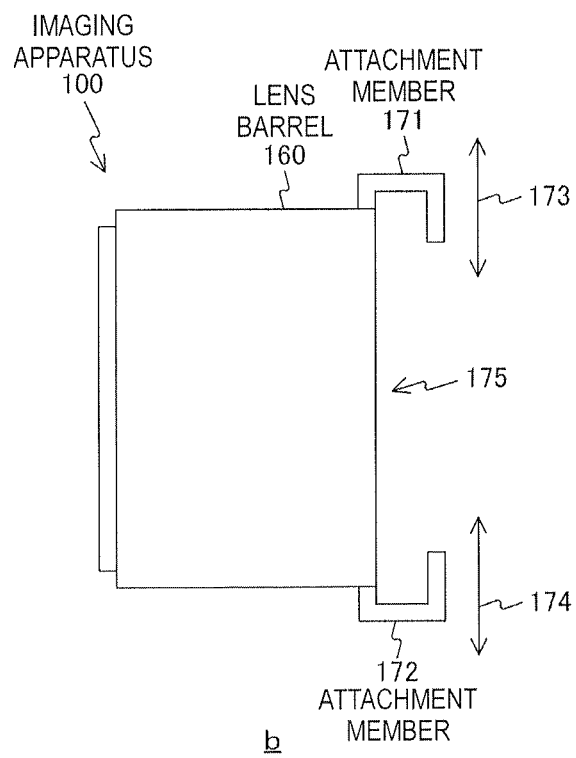

FIG. 1 is a figure which shows an external appearance configuration of an imaging apparatus 100 in a first embodiment of the present technology. A front view of the imaging apparatus 100 is shown in a of FIG. 1, and a side view (a side view in the case where viewed from an arrow A) of the imaging apparatus 100 is shown in b of FIG. 1.

Further, in the embodiments of the present technology, an example will be shown where the imaging apparatus 100 is set to a cylindrical (columnar shaped) imaging apparatus. That is, an example will be shown where the shape of the imaging apparatus 100 is set to a shape so that only a lens portion of a general imaging apparatus (for example, an integrated camera) is taken out. Note that, while the imaging apparatus 100 includes operation members such as a zoom lever and a shutter button, these illustrations are omitted in FIG. 1 or the like. Further, for example, the imaging apparatus 100 is implemented by a digital still camera or a digital video camera (for example, a camera-integrated recorder).

The imaging apparatus 100 includes a lens barrel 160, and attachment members 171 and 172. The lens barrel 160 accommodates each of the members of an optical system, an imaging system or the like.

Figure 2:
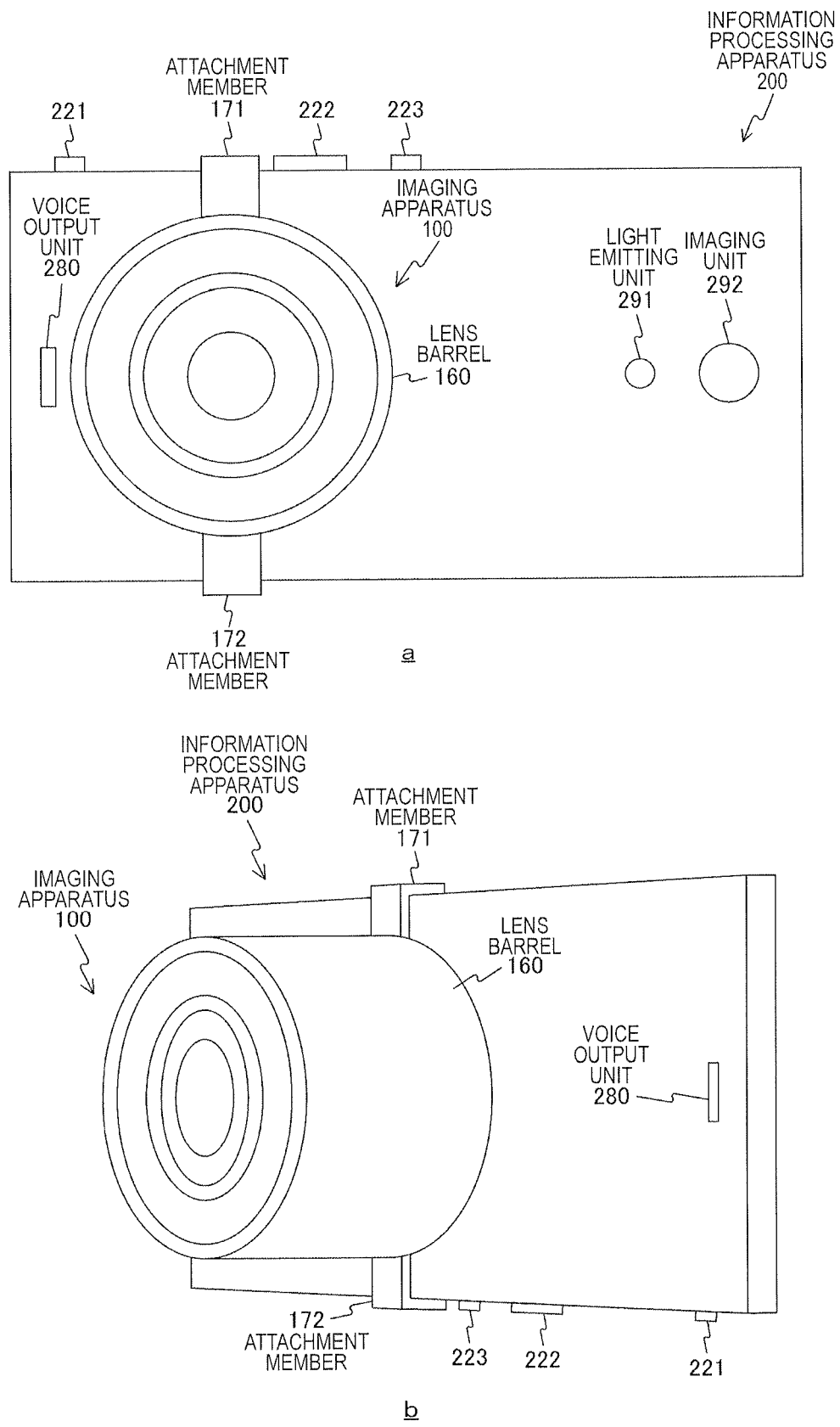
FIG. 2 is a figure which shows an external appearance configuration of the imaging apparatus 100 in a first embodiment of the present technology.

The attachment members 171 and 172 are attachments used at the time when attaching the imaging apparatus 100 to another apparatus (for example, an information processing apparatus 200 shown in FIG. 2). For example, the imaging apparatus 100 can be attached to this apparatus, by causing the attachment member 171 to be moved in an arrow 173 direction, and causing the attachment member 172 to be moved in an arrow 174 direction, in accordance with the shape and size of the other apparatus. That is, the attachment members 171 and 172 are attachments for fixing the imaging apparatus 100 to another apparatus. Further, the attachment surface of the case where the imaging apparatus 100 is mounted on another apparatus is shown as a mounting surface 175 (the surface on the opposite side to the surface of the lens side shown in a of FIG. 1). Note that, an example will be shown in FIG. 2 of the case where the imaging apparatus 100 is attached to another apparatus.

In this way, for example, the imaging apparatus 100 is capable of performing a usual imaging operation, and can be used by mounting on another apparatus (for example, a smartphone). Further, in the case where used by mounting on another apparatus, the imaging apparatus 100 can be operated by a remote operation using the other apparatus.

[Attachment Example of the Imaging Apparatus]

FIG. 2 is a figure which shows an external appearance configuration of the case where the imaging apparatus 100 is attached to an information processing apparatus 200 in the first embodiment of the present technology.

An example is shown in a and b of FIG. 2 of the case where the imaging apparatus 100 is attached to a surface of the information processing apparatus 200 (the surface on which an imaging unit 292 is included). A front view is shown in a of FIG. 2 of the case where the imaging apparatus 100 is attached to the information processing apparatus 200. Further, a perspective view is shown in b of FIG. 2 of the case where the imaging apparatus 100 is shifted and attached to a surface of the information processing apparatus 200.

The information processing apparatus 200 includes operation members 221 through to 223, an input-output unit 240, a voice output unit 280, a light emitting unit 291, and an imaging unit 292. Note that, the information processing apparatus 200 is implemented, for example, by an information processing apparatus such as a smartphone or a tablet terminal.

The operation members 221 through to 223 are operation members used at the time when performing various types of operation inputs.

The input-output unit 240 displays various types of images, and receives an operation input from a user based on a detection state of an object close to or in contact with the display surface of the input-output unit 240.

The voice output unit 280 outputs various types of voice information.

The light emitting unit 291 is a light emitting apparatus for causing light to be emitted to a photographic subject. The light emitting unit 291 is used, for example, at the time when performing an imaging operation by using the information processing apparatus 200 in an environment where sufficient brightness is not able to be expected such as at night or within a room.

The imaging unit 292 generates an image (image data) by capturing a photographic subject.

As shown in FIG. 2, by clamping the main body of the information processing apparatus 200 by the attachment members 171 and 172 of the imaging apparatus 100, the imaging apparatus 100 can be fixed to the information processing apparatus 200.

[Function Configuration Example of the Imaging Apparatus and the Information Processing Apparatus]

Figure 3:
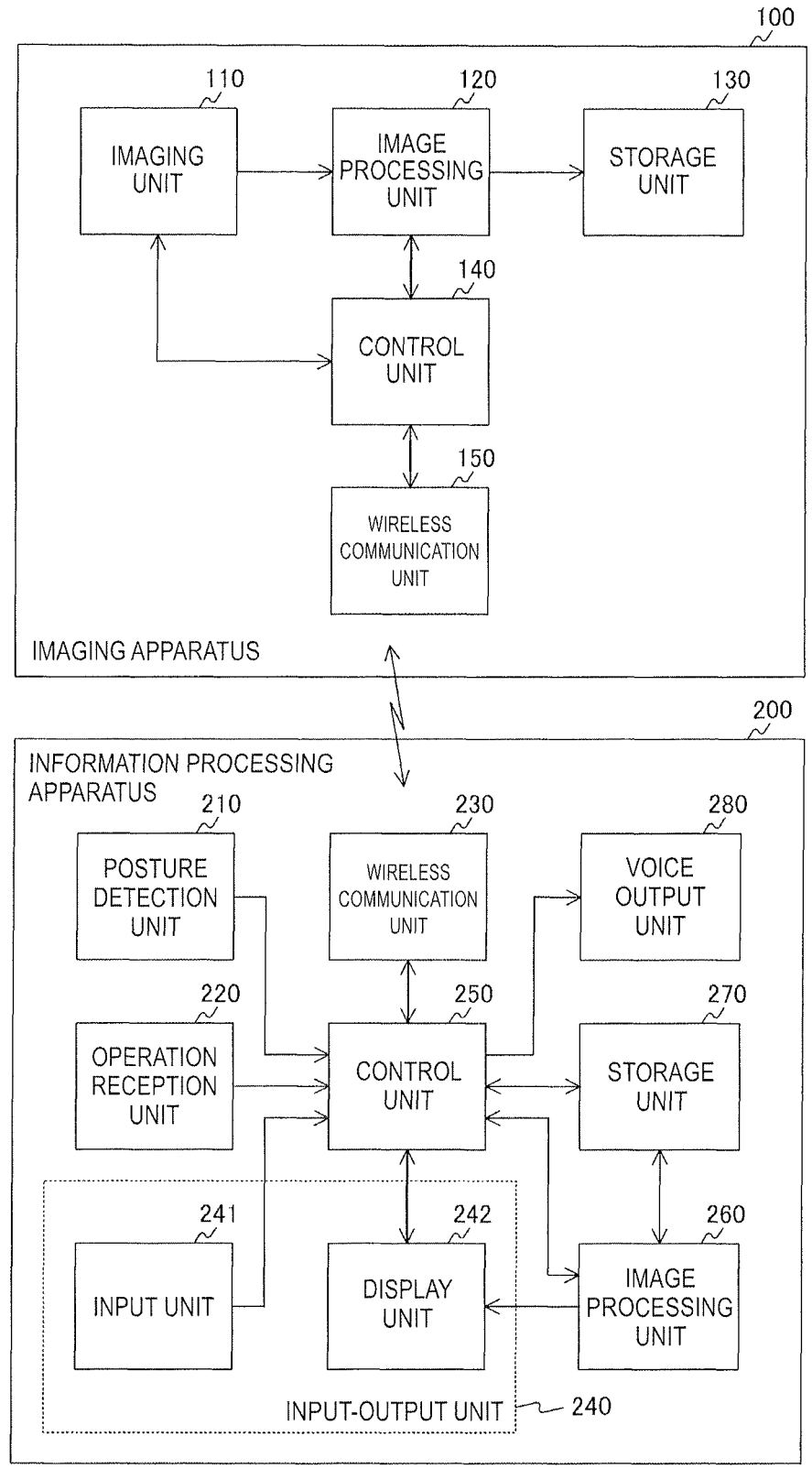
FIG. 3 is a block diagram which shows a function configuration example of the imaging apparatus 100 and an information processing apparatus 200 in a first embodiment of the present technology.

FIG. 3 is a block diagram which shows a function configuration example of the imaging apparatus 100 and the information processing apparatus 200 in the first embodiment of the present technology. Note that, an imaging system constituted by the imaging apparatus 100 and the information processing apparatus 200 is an example of an imaging system described in the claims.

The imaging apparatus 100 includes an imaging unit 110, an image processing unit 120, a storage unit 130, a control unit 140, and a wireless communication unit 150.

The imaging unit 110 generates an image (image data) by capturing a photographic subject, and outputs the generated image to the image processing unit 120. The imaging unit 110 is constituted, for example, by an optical system (a plurality of lens), and an imaging element. Further, the imaging unit 110 has each unit (for example, a zoom lens, a focus lens, a diaphragm) controlled, based on a control of the control unit 140. Note that, in the embodiments of the present technology, in the case where described with "image", it includes both meanings of this image, and image data for displaying this image.

The image processing unit 120 applies a prescribed image process (for example, a de-mosaic process) for an image output from the imaging unit 110, based on a control of the control unit 140, and causes the image to which this image process has been applied to be stored in the storage unit 130. Note that, an image to which an image process has been applied by the image processing unit 120 may be stored in the storage unit 270 by transmitting to the information processing apparatus 200 by using wireless communication.

The storage unit 130 is a recording medium which stores an image to which an image process has been applied by the image processing unit 120 as a content (for example, a still image file, a moving image file). Note that, the storage unit 130 may be built into the imaging apparatus 100, or may be detachable from the imaging apparatus 100.

The control unit 140 controls each of the units in the imaging apparatus 100 based on a control program. For example, the control unit 140 controls each of the units based on an operation input received by operation members such as a zoom lever and a shutter button (not illustrated) included in the imaging apparatus 100. Further, the control unit 140 controls each of the units based on control information from the information processing apparatus 200 received via the wireless communication unit 150. That is, the imaging apparatus 100 can be remotely operated by using the information processing apparatus 200.

The wireless communication unit 150 performs transmission and reception of each information (for example, control data, image data) with other information processing apparatuses (for example, the information processing apparatus 200), by using wireless communication.

Here, a wireless Local Area Network (LAN) can be used, for example, as wireless communication. Wireless Fidelity (Wi-Fi) can be used, for example, as this wireless LAN. Further, wireless communication such as Near Field Communication (NFC), Bluetooth (registered trademark), infrared rays, or portable electric waves can be used, for example, as wireless communication.

Further, a plurality of wireless communication systems may be used. For example, at the time of the start of wireless communication, an exchange of data (for example, a Service Set Identifier (SSID)) related to Wi-Fi when turning on a power source is performed by NFC. Then, the exchange of data from here onwards can be performed by Wi-Fi.

The information processing apparatus 200 includes a posture detection unit 210, an operation reception unit 220, a wireless communication unit 230, an input-output unit 240, a control unit 250, an image processing unit 260, a storage unit 270, and a voice output unit 280.

The posture detection unit 210 detects a change in the posture of the information processing apparatus 200 by detecting an acceleration, movement, orientation or the like of the information processing apparatus 200, and outputs posture information related to the detected change in posture to the control unit 250. Note that, various types of sensors such as a gyro sensor or an acceleration sensor can be used, for example, as the posture detection unit 210.

The operation reception unit 220 is an operation reception unit which receives an operation performed by a user, and outputs control information (operation information) corresponding to the received operation content to the control unit 250. Note that, the operation reception unit 220 corresponds, for example, to the operation members 221 through to 223 shown in FIG. 2.

The wireless communication unit 230 performs transmission and reception of each information (for example, control data, image data) with other information processing apparatuses (for example, the imaging apparatus 100) by wireless communication, based on a control of the control unit 250. The above described wireless LAN (for example, Wi-Fi), NFC, Bluetooth, infrared rays, or portable electric waves can be used, for example, as wireless communication. Further, a plurality of wireless communication systems may be used.

The input-output unit 240 has an input unit 241 and a display unit 242 constituted as one body. Further, the input-output unit 240 displays various types of images in a display unit 242 based on a control of the control unit 250, and receives an operation input from a user by the input unit 241 based on a detection state of an object close to or in contact with the display surface of the display unit 242. Further, the input unit 241 outputs control information corresponding to the received operation input to the control unit 250.

For example, an electrostatic type (electrostatic capacitance system) touch panel, which detects contact or closeness of an object having conductivity (for example, a person's finger) based on a change in electrostatic capacitance, can be used as the input unit 241. Further, for example, a display panel such as a Liquid Crystal Display (LCD) or an organic Electro Luminescence (EL) panel can be used as the display unit 242. Also, the input-output unit 240 is constituted, for example, by overlapping a transparent touch panel on the display surface of a display panel.

For example, an operation of the information processing apparatus 200 or the imaging apparatus 100 becomes possible by having a user perform a contact operation (or, a closeness operation) of an operation object or the like displayed in the display unit 242. Here, for example, operation objects are displayed in the input-output unit 240, such as operation objects 302 through to 306 shown in FIG. 6, and are operation buttons (GUI buttons) or the like for performing an operation input.

The control unit 250 controls each of the units in the information processing apparatus 200 based on a control program. For example, the control unit 250 decides the posture of the information processing apparatus 200, based on posture information from the posture detection unit 210, and switches a display screen for displaying in the input-output unit 240, based on this decision result. For example, the control unit 250 decides the up-down direction of the posture of the information processing apparatus 200, based on posture information from the posture detection unit 210, and switches the up-down direction of a display screen for displaying in the input-output unit 240, based on this decision result.

Further, for example, in the case where the information processing apparatus 200 and the imaging apparatus 100 are connected via the wireless communication unit 230, the control unit 250 causes a display screen related to an imaging operation of the imaging apparatus 100 to be displayed in the input-output unit 240. In this case, the control unit 250 performs a control for switching a display state of a display screen related to an imaging operation of the imaging apparatus 100, based on a connection number of imaging apparatuses and information processing apparatuses (a connection number which includes the imaging apparatus 100 and the information processing apparatus 200).

For example, the control unit 250 performs a control for switching a display state of a display screen, based on the number of information processing apparatuses connected to the imaging apparatus 100 (a number which includes the information processing apparatus 200). For example, in the case where only the information processing apparatus 200 is connected to the imaging apparatus 100 (in the case where the connection number of information processing apparatuses is 1), the control unit 250 performs a control for causing a display screen (for example, the display screen shown in FIG. 6) for operating the imaging apparatus 100 to be displayed. On the other hand, in the case where a plurality of information processing apparatuses are connected to the imaging apparatus 100 (in the case where the connection number of information processing apparatuses is 1), the control unit 250 performs a control for causing a display screen (for example, the display screen shown in FIG. 7) corresponding to the presence or absence of an operation right for operating the imaging apparatus 100 to be displayed.

For example, it is assumed to be a case where a plurality of information processing apparatuses (which includes the information processing apparatus 200) are connected to the imaging apparatus 100. In this case, at the time when the information processing apparatus 200 has an operation right, the control unit 250 causes a display screen (for example, the display screen shown in a of FIG. 7), which includes an image generated by the imaging apparatus 100 (a live view image) and operation objects for operating the imaging apparatus 100, to be displayed. On the other hand, at the time when the information processing apparatus 200 does not have an operation right, the control unit 250 performs a control for causing a display screen (for example, the display screen shown in b of FIG. 7), which includes an image generated by the imaging apparatus 100 (a live view image), to be displayed. Here, an operation right is a right which operates the imaging apparatus connected by using wireless communication.

In this way, in the information processing apparatus 200, a display state of a display screen is switched based on a connection number of imaging apparatuses 100 and information processing apparatuses 200 connected by using wireless communication. Further, the control unit 140 of the imaging apparatus 100 performs a control related to an imaging operation based on an operation input using a display screen performed in the information processing apparatus 200 in which this display screen is displayed.

The image processing unit 260 applies a prescribed image process for an image generated by the imaging apparatus 100 or an image generated by the imaging unit 292 (shown in a of FIG. 2), based on a control of the control unit 250, and causes the image to which this image process has been applied to be displayed in the display unit 242. Further, the image processing unit 260 causes these images to be stored in the storage unit 270, based on a control of the control unit 250. Further, the image processing unit 260 causes a display screen, used in the case where an imaging operation using the imaging apparatus 100 is performed, to be displayed in the display unit 242, based on a control of the control unit 250.

The storage unit 270 is a recording medium which stores each information, based on a control of the control unit 250. For example, an image generated by the imaging apparatus 100 or an image generated by the imaging unit 292 (shown in a of FIG. 2) is stored as a content (for example, a still image file, a moving image file) in the storage unit 270. Note that, the storage unit 270 may be built into the information processing apparatus 200, or may be detachable from the information processing apparatus 200.

The voice output unit 280 outputs voice information, based on a control of the control unit 250. The voice output unit 280 can be implemented, for example, by a speaker.

[Use Examples of the Imaging Apparatus and the Information Processing Apparatus]

Figure 4:
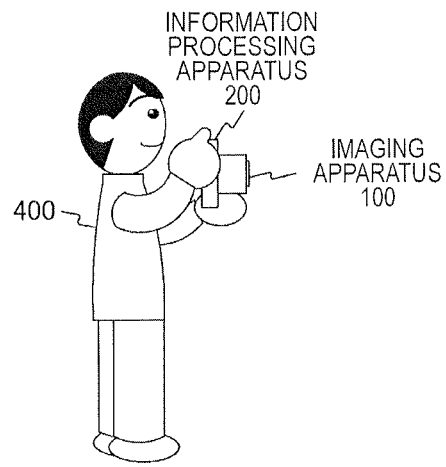
FIG. 4 is a figure which shows a use example of the imaging apparatus 100 and information processing apparatuses 200 through to 203 in a first embodiment of the present technology.
Figure 4:
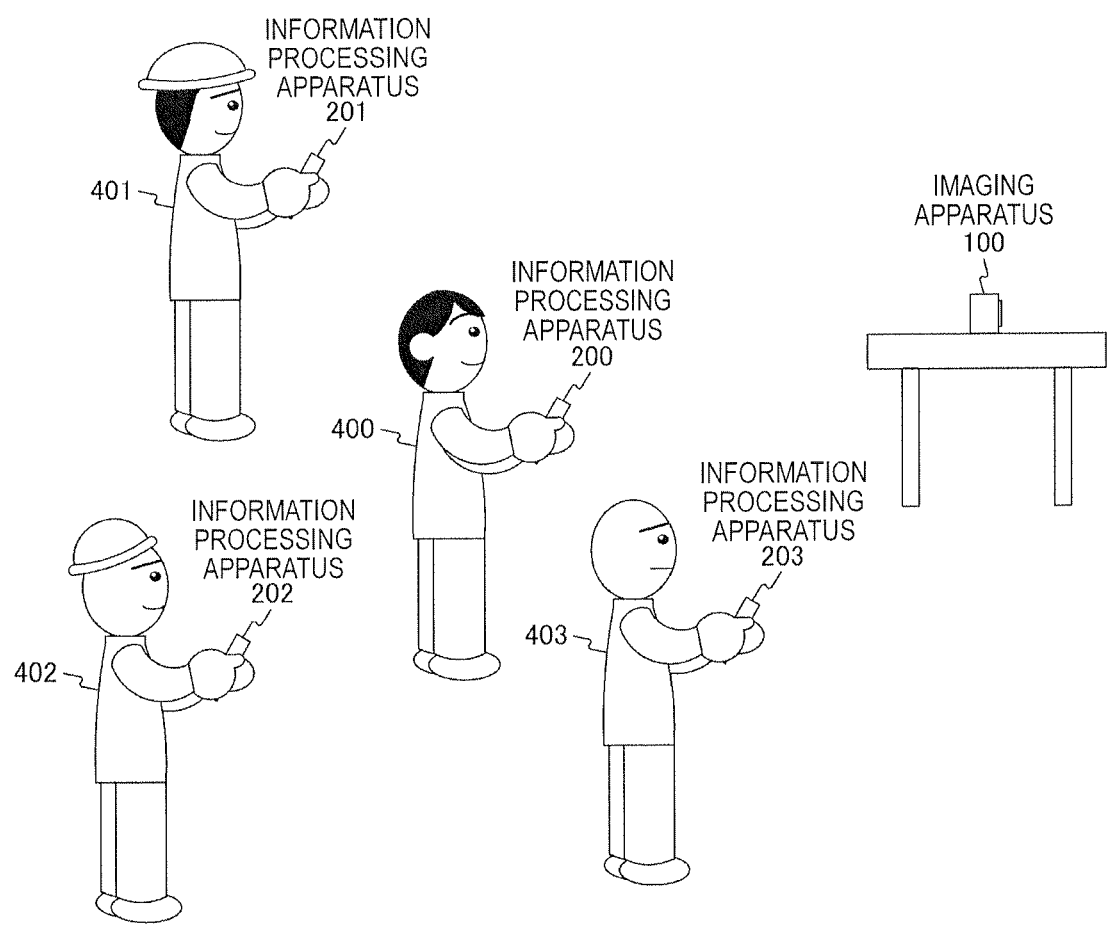
Figure 5:
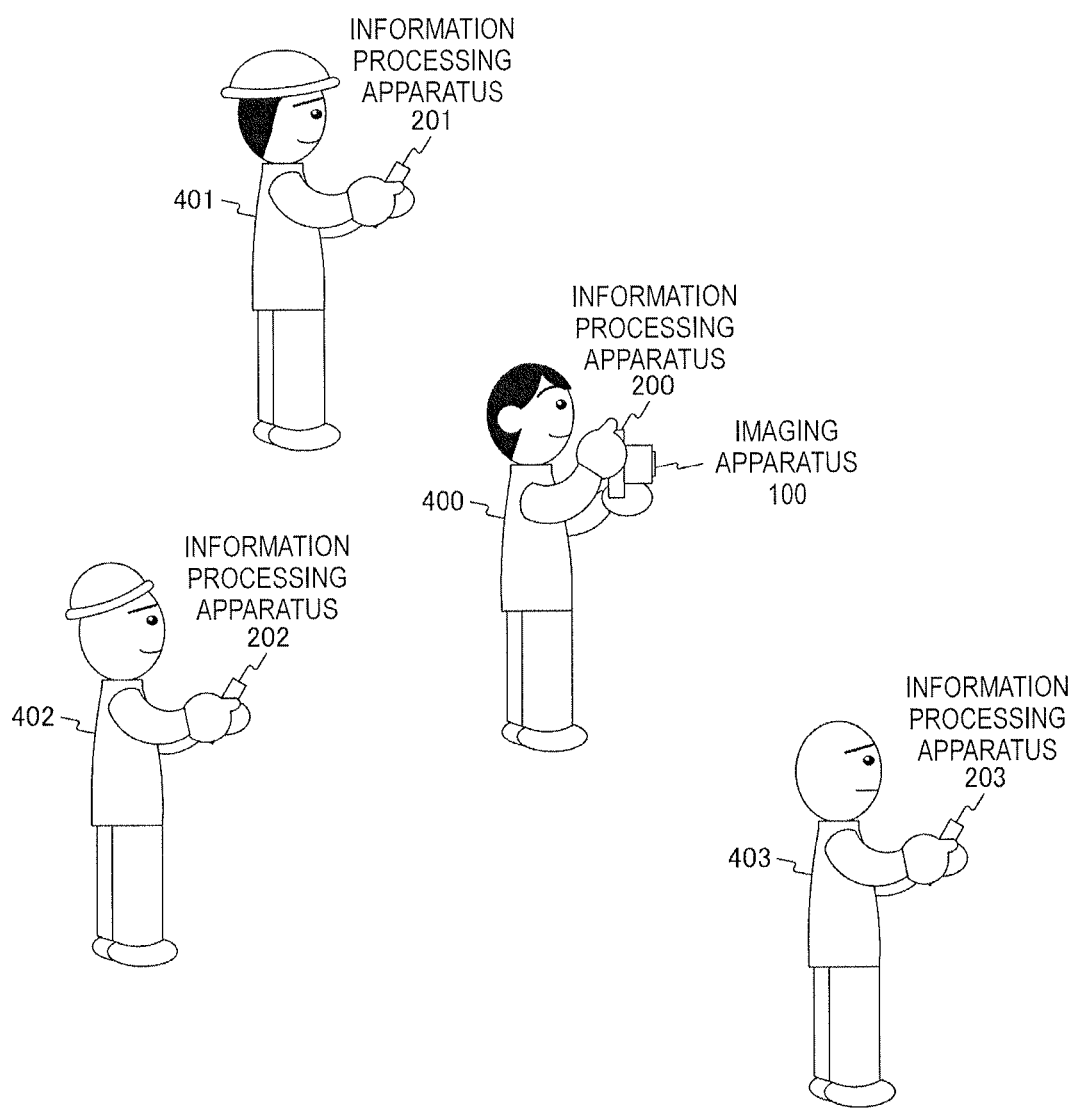
FIG. 5 is a figure which shows a use example of the imaging apparatus 100 and the information processing apparatuses 200 through to 203 in a first embodiment of the present technology.

FIG. 4 and FIG. 5 are figures which show use examples of the imaging apparatus 100 and information processing apparatuses 200 through to 203 in the first embodiment of the present technology. Note that, since the configurations of the information processing apparatuses 201 through to 203 are similar to that of the information processing apparatus 200, a description of them will be omitted here.

An example is shown in a of FIG. 4 of the case where using one imaging apparatus 100 mounted on one information processing apparatus 200. For example, as shown in FIG. 2, the imaging apparatus 100 can be mounted on a surface of the information processing apparatus 200 (the surface on which the imaging unit 292 is installed). In this case, by using the information processing apparatus 200 on which the imaging apparatus 100 is mounted, a user 400 can perform photography approximately the same as photography using a general imaging apparatus (for example, an integrated camera).

Examples are shown in b of FIG. 4 and FIG. 5 of the case where using one imaging apparatus 100 connected to a plurality of information processing apparatuses 200 through to 203. For example, in the case where a plurality of users 400 through to 403 view an image of the same photographic subject in real time, a case is assumed so that one user 400 is in charge of photography.

A use example is shown in b of FIG. 4 where the imaging apparatus 100 is set at a location separated from the plurality of information processing apparatuses 200 through to 203. In this case, the imaging apparatus 100 can be remotely operated by using any of the plurality of information processing apparatuses 200 through to 203.

An example is shown in FIG. 5 of the case where using the imaging apparatus 100 mounted on the information processing apparatus 200. Also in this case, the imaging apparatus 100 can be remotely operated by using any of the plurality of information processing apparatuses 200 through to 203 (for example, the information processing apparatus 200).

In this way, it is assumed to be a case where using one information processing apparatus 200 connected to one imaging apparatus 100, or a case where using a plurality of information processing apparatuses 200 through to 203 connected to one imaging apparatus 100. Accordingly, in the first embodiment of the present technology, an example is shown where a display state of a display screen is switched based on the number of information processing apparatuses connected to one imaging apparatus 100.

[Acquisition Example of the Connection Number of Information Processing Apparatuses]

Here, a method will be described which acquires the number of information processing apparatuses connected to the imaging apparatus 100. For example, the control unit 140 of the imaging apparatus 100 can comprehend the number (connection number) of information processing apparatuses connected to the wireless communication unit 150 by using wireless communication. Accordingly, the control unit 140 of the imaging apparatus 100 regularly or irregularly notifies this connection number to each of the information processing apparatuses connected to the wireless communication unit 150 by using wireless communication. For example, the control unit 140 of the imaging apparatus 100 may notify the connection number, in accordance with requests from each of the information processing apparatuses, or may notify the connection number to each of the information processing apparatuses each time the connection number is changed.

In this way, each of the information processing apparatuses connected to the imaging apparatus 100 by using wireless communication can acquire the connection number by a notification from the imaging apparatus 100.

[Example where the Mounting of the Imaging Apparatus is Detected]

Next, a method will be described which detects the mounting of the imaging apparatus 100 in the information processing apparatus 200.

[Detection Example Using a Received Electric Wave Intensity]

For example, a distance between the imaging apparatus 100 and the information processing apparatus 200 can be estimated by using a received electric wave intensity. For example, a table showing a relationship between a received electric wave intensity and a distance is created beforehand, and stored in the storage unit 270. Then, the control unit 250 of the information processing apparatus 200 can acquire, from this table, a distance corresponding to a received electric wave intensity acquired by the wireless communication unit 230, and can use this distance as a distance between the imaging apparatus 100 and the information processing apparatus 200. For example, in the case where this distance is small on the basis of a threshold (for example, approximately 1 cm), the control unit 250 of the information processing apparatus 200 can decide that the imaging apparatus 100 has been mounted on the information processing apparatus 200.

[Example where a Member for Detecting the Mounting is Used]

For example, the mounting of the imaging apparatus 100 can be detected by using a member for detecting that the imaging apparatus 100 has been mounted on the information processing apparatus 200. A switch can be installed in at least one of the imaging apparatus 100 and the information processing apparatus 200, for example, as this member.

For example, it is assumed to be a case where a switch is installed in the imaging apparatus 100. In this case, at the time when the imaging apparatus 100 has been mounted on the information processing apparatus 200, this mounting is detected by this switch, and information showing that this mounting has been detected is output to the control unit 140. Then, in the case where the information showing that this mounting has been detected is acquired, the control unit 140 transmits this to the information processing apparatus 200 via the wireless communication unit 150. In this way, the control unit 250 of the information processing apparatus 200 can detect that the imaging apparatus 100 has been mounted on the information processing apparatus 200.

Further, for example, it is assumed to be a case where a switch is installed in the information processing apparatus 200. In this case, at the time when the imaging apparatus 100 has been mounted on the information processing apparatus 200, this mounting is detected by this switch, and information showing that this mounting has been detected is output to the control unit 250. In this way, the control unit 250 of the information processing apparatus 200 can detect that the imaging apparatus 100 has been mounted on the information processing apparatus 200.

Further, the imaging apparatus 100 being mounted on the information processing apparatus 200 may be detected, by using another sensor. For example, a distance sensor (for example, a sensor which detects a distance by using infrared rays or ultrasonic waves) can be used. Further, for example, a distance between the imaging apparatus 100 and the information processing apparatus 200 may be detected by using a Global Positioning System (GPS), and the imaging apparatus 100 being mounted on the information processing apparatus 200 may be detected, based on this distance. For example, the respective positions of the imaging apparatus 100 and the information processing apparatus 200 can be acquired by using GPS, and a distance between the imaging apparatus 100 and the information processing apparatus 200 can be calculated based on these positions.

Note that, the above described detection method of a distance and detection method of the mounting are examples, and are not limited to these, and other detection methods may be used.

[Display Example of the Display Screen]

Figure 6:
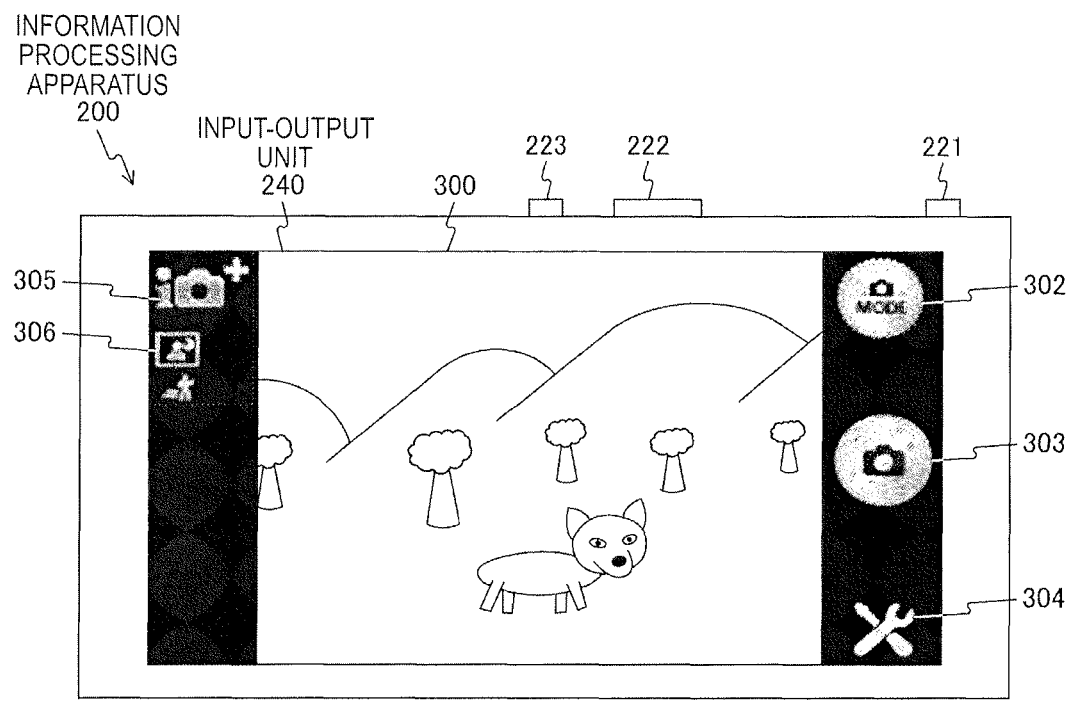
FIG. 6 is a figure which shows a display example of a display screen displayed in an input-output unit 240 in a first embodiment of the present technology.
Figure 7:
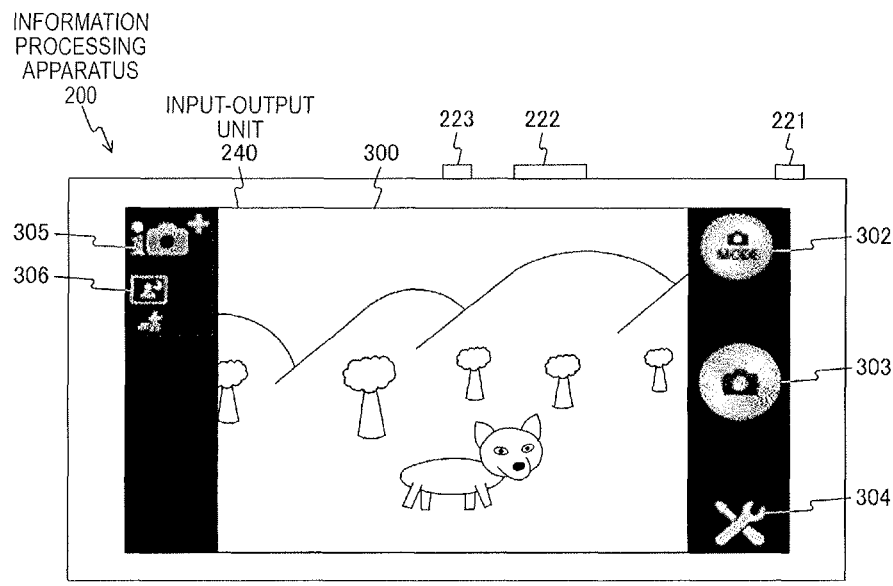
FIG. 7 is a figure which shows a display example of a display screen displayed in the input-output unit 240 in a first embodiment of the present technology.
Figure 7:
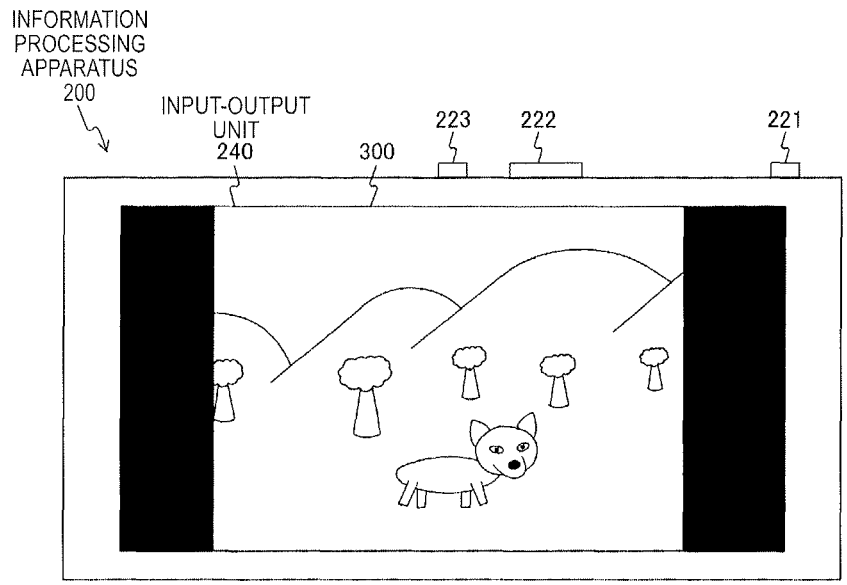

FIG. 6 and FIG. 7 are figures which show display examples of a display screen displayed in the input-output unit 240 in the first embodiment of the present technology.

[Display Example of the Case where One Information Processing Apparatus is Connected to One Imaging Apparatus]

A display example is shown in FIG. 6 of the case where one information processing apparatus 200 is connected to one imaging apparatus 100.

An example is shown in FIG. 6, in the case where an imaging operation using the imaging apparatus 100 and the information processing apparatus 200 is performed, where an image generated by the imaging unit 110 of the imaging apparatus 100 is displayed in the input-output unit 240 as a live view image 300. That is, an image generated by the imaging unit 110 of the imaging apparatus 100 is sequentially transmitted to the information processing apparatus 200, via the wireless communication units 150 and 230, and this image is displayed in the input-output unit 240 as a live view image. Note that, an example is shown in FIG. 6 where an image, in which a dog walking in front of mountains is set to a photographic subject, is displayed as the live view image 300.

Further, an example is shown in FIG. 6, in the case where an imaging operation using the imaging apparatus 100 and the information processing apparatus 200 is performed, where operation objects 302 through to 306 for operating the imaging apparatus 100 are displayed in the input-output unit 240. Note that, while an example is shown in FIG. 6 where the operation objects 302 through to 306 are displayed around the live view image, they may be displayed overlapping the live view image.

Note that, the operation object 302 is an operation object pressed at the time when switching a photography mode of the imaging apparatus 100. Further, the operation object 303 is an operation object pressed at the time when performing a shutter operation of the imaging apparatus 100. Further, the operation object 304 is an operation object pressed at the time when performing various types of setting operations of the imaging apparatus 100. Further, the operation object 305 is an operation object pressed at the time when switching an exposure mode of the imaging apparatus 100. Further, the operation object 306 is an operation object for displaying scene information set in the imaging apparatus 100.

In this way, in the case where one information processing apparatus 200 is connected to one imaging apparatus 100, the live view image 300 is displayed, and the plurality of operation objects 302 through to 306 are displayed on both sides of the live view image 300.

A display example is shown in FIG. 6 of the case where one information processing apparatus 200 is connected to one imaging apparatus 100. Further, a display example is shown in FIG. 7 of the case where a plurality of information processing apparatuses are connected to one imaging apparatus 100.

[Display Example of the Case where a Plurality of Information Processing Apparatuses are Connected to One Imaging Apparatus]

A display example is shown in FIG. 7 of the case where a plurality of information processing apparatuses (for example, the information processing apparatuses 200 through to 203 shown in b of FIG. 4) are connected to one imaging apparatus 100.

Here, in the first embodiment of the present technology, an example is shown, in the case where a plurality of information processing apparatuses are connected to one imaging apparatus, where an operation right and a live view right are set in each of the information processing apparatuses.

Here, an operation right is a right which operates the imaging apparatus connected by using wireless communication, such as described above. This operation right can be set, for example, for only a prescribed number (for example, 1) information processing apparatuses from among the plurality of information processing apparatuses. For example, in the case where an information processing apparatus on which the imaging apparatus is mounted is present, an operation right can be set in this information processing apparatus. Further, for example, in the case where an information processing apparatus on which the imaging apparatus is mounted is not present, an operation right can be set based on a prescribed rule or user operation. For example, a rule, which sets an operation right to the initially connected information processing apparatus, can be set to the prescribed rule. Further, the operation right may be moved from the initially set information processing apparatus to another information processing apparatus. For example, the operation right can be moved based on a prescribed rule (for example, moved in a 5 minute interval) or a user operation.

Further, a live view right is a right which displays an image generated by the imaging apparatus connected by using wireless communication as the live view image. This live view right can be set, for example, for all of the plurality of information processing apparatuses. Note that, the live view right may not be set in a part of the plurality of information processing apparatuses.

An example is shown in a of FIG. 7 of a display screen displayed in the input-output unit 240 in the case where the information processing apparatus 200 has an operation right and live view right. In this case, since the information processing apparatus 200 has an operation right, the operation objects 302 through to 306 for operating the imaging apparatus 100 are displayed in the input-output unit 240, similar to the example shown in FIG. 6.

An example is shown in b of FIG. 7 of a display screen displayed in the input-output unit 240 in the case where the information processing apparatus 200 has only a live view right (in the case where the information processing apparatus 200 does not have an operation right). In this case, since the information processing apparatus 200 does not have an operation right, the operation objects 302 through to 306 for operating the imaging apparatus 100 are not displayed. Accordingly, only the live view image 300 is displayed in the input-output unit 240.

In this way, in the case where a plurality of information processing apparatuses are connected to one imaging apparatus 100, the live view image 300 is displayed in all of the information processing apparatuses. However, the plurality of operation objects 302 through to 306 are displayed in only an information processing apparatus which has an operation right.

[Operation Example of the Information Processing Apparatus]

Figure 8:
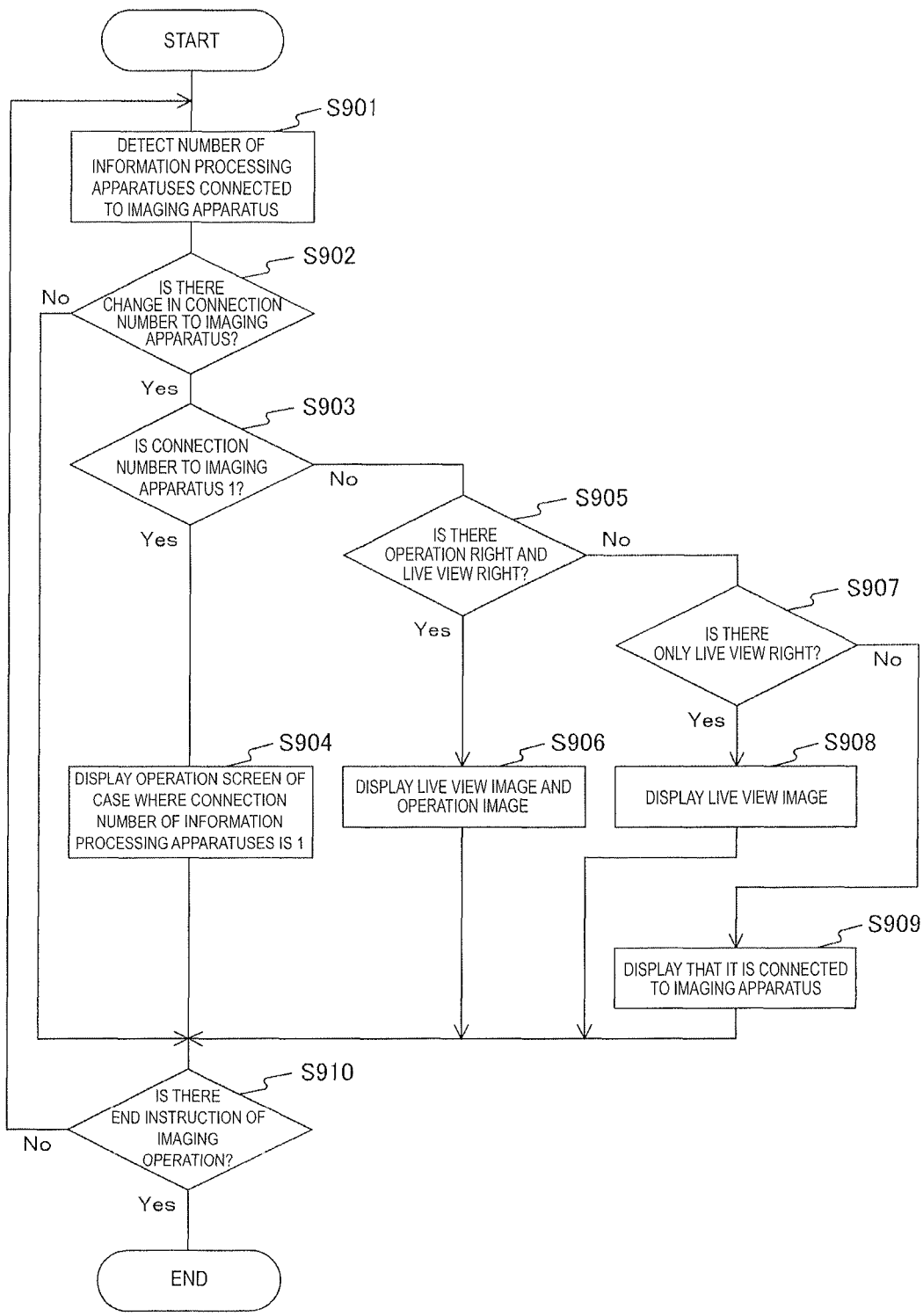
FIG. 8 is a flow chart which shows an example of a process procedure of a display control process by the information processing apparatus 200 in a first embodiment of the present technology.

FIG. 8 is a flow chart which shows an example of a process procedure of a display control process by the information processing apparatus 200 in the first embodiment of the present technology.

First, the control unit 250 detects the number (connection number) of information processing apparatuses connected to the imaging apparatus 100 by using wireless communication (step S901). This detection method of the connection number can use any of the above described methods.

To continue, the control unit 250 decides whether or not a change has occurred in the connection number to the imaging apparatus 100 (step S902). Here, the case where a change has occurred in the connection number means, for example, the case where the connection number has increased, or the case where the connection number has decreased. Then, in the case where a change has not occurred in the connection number (step S902), it proceeds to step S910.

Further, in the case where a change has occurred in the connection number (step S902), the control unit 250 decides whether or not the connection number after this change is 1 (step S903). Then, in the case where the connection number after this change is 1 (step S903), the control unit 250 causes a display screen of the case where the connection number is 1 to be displayed in the input-output unit 240 (step S904). For example, the display screen shown in FIG. 6 is displayed in the input-output unit 240.

In the case where the connection number after this change is not 1 (in the case of 2 or more) (step S903), the control unit 250 decides whether or not an operation right and a live view right are set in the information processing apparatus 200 (step S905). Then, in the case where an operation right and a live view right are set in the information processing apparatus 200 (step S905), a display screen of the case where an operation right and a live view right are set is displayed in the input-output unit 240 (step S906). For example, the display screen shown in a of FIG. 7 is displayed in the input-output unit 240.

Further, in the case where only a live view right is set in the information processing apparatus 200 (step S907), a display screen of the case where only a live view right is set is displayed in the input-output unit 240 (step S908). For example, the display screen shown in b of FIG. 7 is displayed in the input-output unit 240. Note that, in the case where a live view right is not set in the information processing apparatus 200 (step S907), a display screen for notifying that it is connected to the imaging apparatus 100 is displayed in the input-output unit 240 (step S909).

To continue, the control unit 250 decides whether or not there is an end instruction of the imaging operation (step S910), and in the case where there is no end instruction of the imaging operation, it returns to step S901, and in the case where there is an end instruction of the imaging operation, the operation of the display control process ends.

2. Second Embodiment

In the first embodiment of the present technology, an example has been shown where a display state of a display screen is switched based on the number of information processing apparatuses connected to one imaging apparatus. Here, for example, it is assumed that a plurality of imaging apparatuses are connected to one information processing apparatus.

Accordingly, in a second embodiment of the present technology, an example is shown where a display state of a display screen is switched based on the number of imaging apparatuses connected to one information processing apparatus. Note that, the imaging apparatus and the information processing apparatus in the second embodiment of the present technology are the same as the imaging apparatus 100 and the information processing apparatus 200 shown in FIG. 1 through to FIG. 3.

Accordingly, a part of these descriptions will be omitted, for each of the apparatuses in the second embodiment of the present technology, by attaching reference numerals the same as those of the first embodiment of the present technology.

[Use Example of the Imaging Apparatus and the Information Processing Apparatus]

Figure 9:
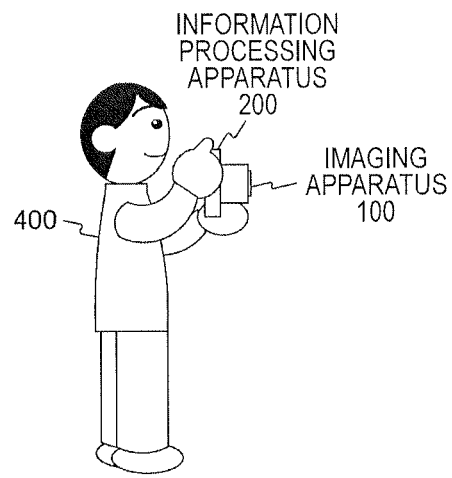
FIG. 9 is a figure which shows a use example of imaging apparatuses 100 through to 103 and the information processing apparatus 200 in a second embodiment of the present technology.
Figure 9:
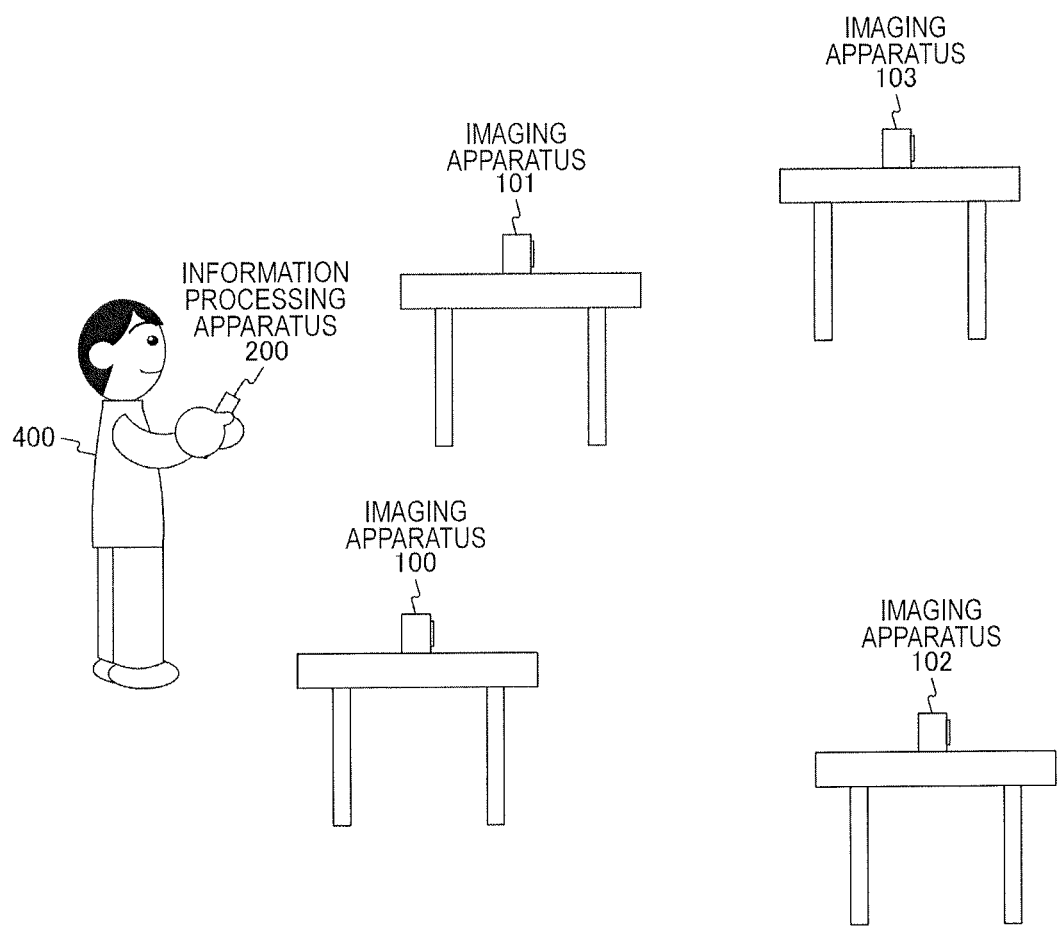
Figure 10:
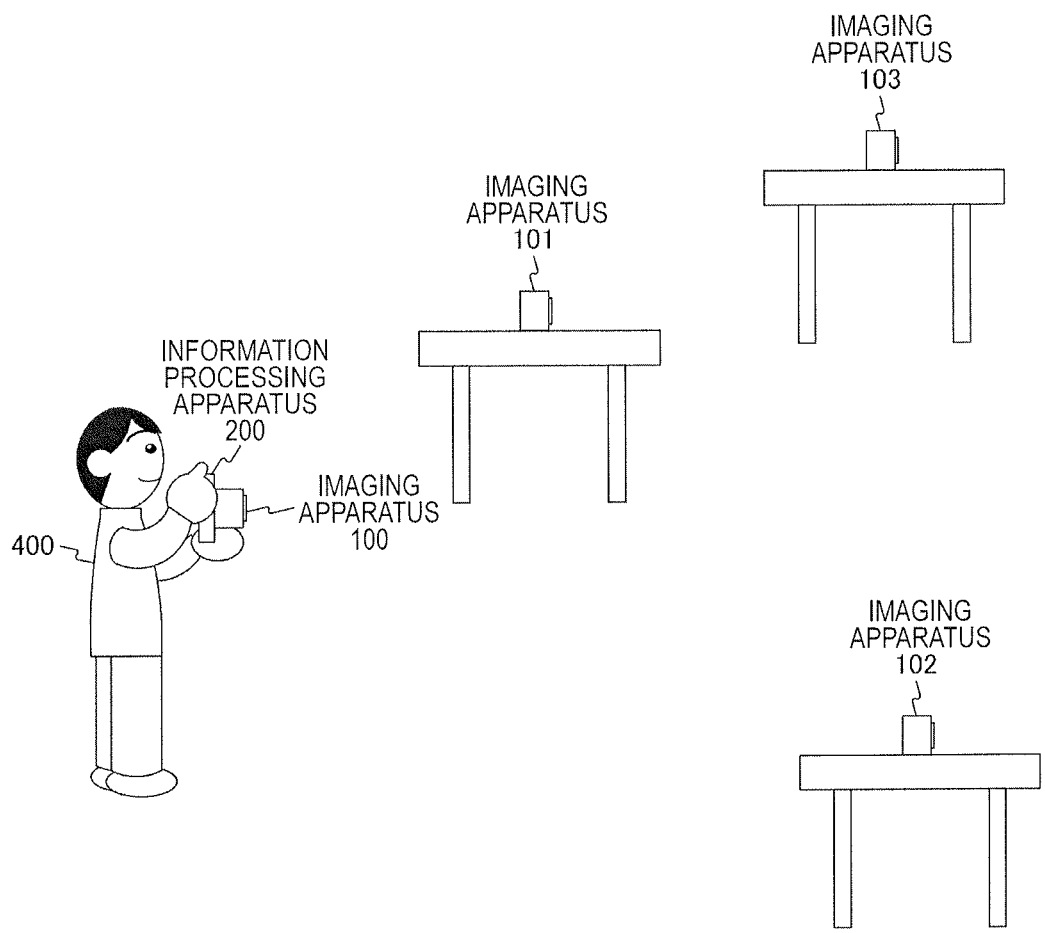
FIG. 10 is a figure which shows a use example of the imaging apparatuses 100 through to 103 and the information processing apparatus 200 in a second embodiment of the present technology.

FIG. 9 and FIG. 10 are figures which show use examples of imaging apparatuses 100 through to 103 and the information processing apparatus 200 in the second embodiment of the present technology. Note that, since the configurations of the imaging apparatuses 101 through to 103 are similar to that of the imaging apparatus 100, a description of them will be omitted here.

An example is shown in a of FIG. 9 of the case where using one imaging apparatus 100 mounted on one information processing apparatus 200. The example shown in a of FIG. 9 is similar to that of a of FIG. 4. Further, the display screen in this case can also be set similar to that of FIG. 6.

Examples are shown in b of FIG. 9 and FIG. 10 of the case where using one information processing apparatus 200 connected to a plurality of imaging apparatuses 100 through to 103. For example, it is assumed to be a case where one user 400 simultaneously photographs the same photographic subject from each direction.

A use example is shown in b of FIG. 9 where the plurality of imaging apparatuses 100 through to 103 are set at locations separated from the information processing apparatus 200. In this case, the plurality of imaging apparatuses 100 through to 103 can be remotely operated by using one information processing apparatus 200.

An example is shown in FIG. 10 of the case where using the imaging apparatus 100 mounted on the information processing apparatus 200. Also in this case, the plurality of imaging apparatuses 100 through to 103 can be remotely operated by using one information processing apparatus 200.

In this way, it is assumed to be a case where using one information processing apparatus 200 connected to one imaging apparatus 100, or a case where using a plurality of imaging apparatuses 100 through to 103 connected to one information processing apparatus 200. Accordingly, in the second embodiment of the present technology, an example is shown where a display state of a display screen is switched based on the number of imaging apparatuses connected to one information processing apparatus 200.

[Acquisition Example of the Connection Number of Imaging Apparatuses]

Here, a method will be described which acquires the number of imaging apparatuses connected to the information processing apparatus 200. For example, the control unit 250 of the information processing apparatus 200 can comprehend the number (connection number) of imaging apparatuses connected to the wireless communication unit 230 by using wireless communication. Accordingly, the control unit 250 of the information processing apparatus 200 can switch a display state of a display screen by using this comprehended connection number.

[Display Example of the Case where a Plurality of Imaging Apparatuses are Connected to One Information Processing Apparatus]

Figure 11:
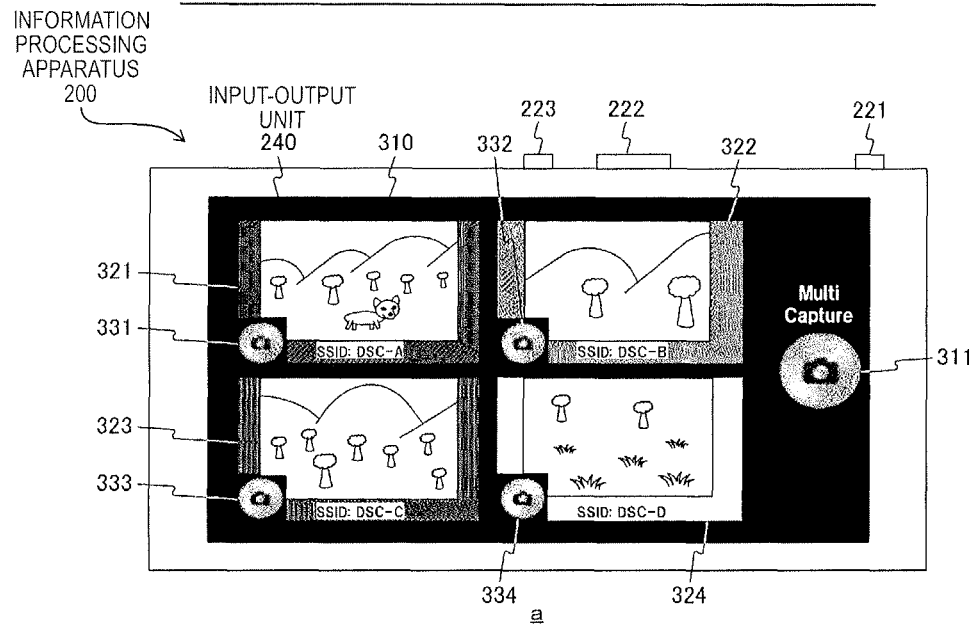
FIG. 11 is a figure which shows a display example of a display screen displayed in the input-output unit 240 in a second embodiment of the present technology.
Figure 11:
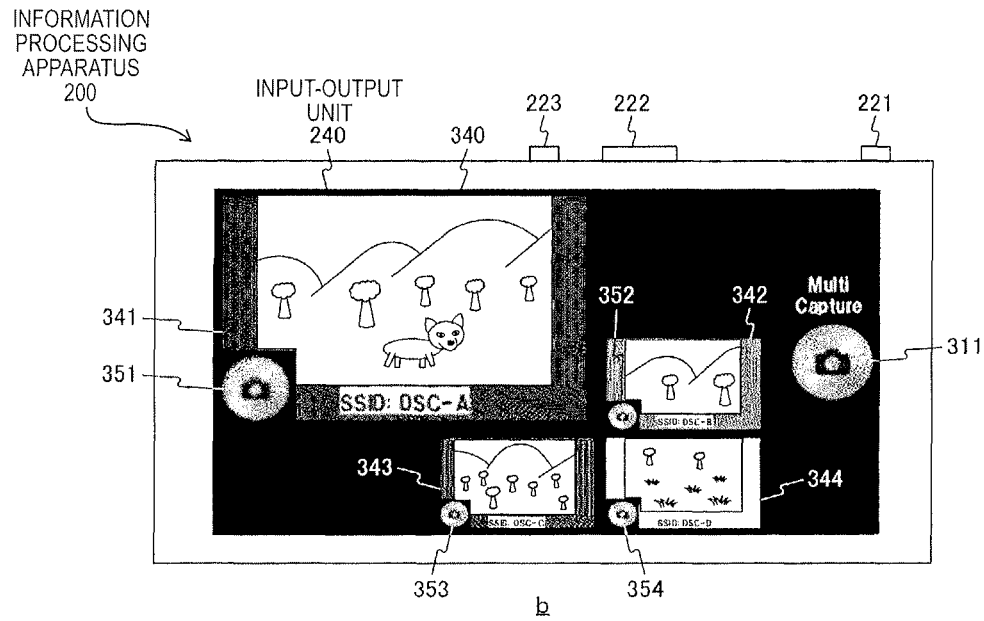

FIG. 11 is a figure which shows a display example of a display screen displayed in the input-output unit 240 in the second embodiment of the present technology. A display example is shown in FIG. 11 of the case where 4 imaging apparatuses 100 through to 103 are connected to one information processing apparatus 200, such as shown in b of FIG. 9.

[Example where Live View Images of the Respective Imaging Apparatuses are Displayed with the Same Size]

A display example (display screen 310) is shown in a of FIG. 11 of the case where live view images of the respective imaging apparatuses connected to one information processing apparatus 200 are displayed with the same size.

Live view image display regions 321 through to 324, which correspond to the 4 imaging apparatuses 100 through to 103 connected to the information processing apparatus 200, are displayed on the display screen 310. That is, in the display screen 310, 1 live view image display region is arranged for each imaging apparatus. Also, images generated by corresponding imaging apparatuses are displayed as live view images in the live view image display regions 321 through to 324. For example, an image generated by the imaging apparatus 100 is displayed as a live view image in the live view image display region 321, and an image generated by the imaging apparatus 101 is displayed as a live view image in the live view image display region 322. Further, for example, an image generated by the imaging apparatus 102 is displayed as a live view image in the live view image display region 323, and an image generated by the imaging apparatus 103 is displayed as a live view image in the live view image display region 324.

Further, identification information for identifying the corresponding imaging apparatuses are displayed in the live view image display regions 321 through to 324. An example is shown in a of FIG. 11 where each of the identification information are displayed in the lower side regions of the live view image display regions 321 through to 324.

Further, operation objects 311 and 331 through to 334 are displayed on the display screen 310. The operation objects 311 and 331 through to 334 are operation objects pressed at the time when performing a shutter operation of the imaging apparatus. That is, the operation objects 311 and 331 through to 334 are operation objects pressed at the time when instructing a recording operation of an image to an imaging apparatus.

The operation object 311 is an operation object pressed at the time when performing a shutter operation for all of the 4 imaging apparatuses 100 through to 103. That is, the operation object 311 is an operation object for simultaneously operating a plurality of imaging apparatuses. By using this operation object 311, respective shutter operations of the plurality of imaging apparatuses 100 through to 103 can be performed with a 1 time operation (a pressing operation of the operation object 311).

Further, the operation objects 331 through to 334 are arranged for each of the imaging apparatuses, similar to the live view image display regions 321 through to 324. For example, the operation object 331 is an operation object pressed at the time when performing a shutter operation of the imaging apparatus 100, and the operation object 332 is an operation object pressed at the time when performing a shutter operation of the imaging apparatus 101. Further, the operation object 333 is an operation object pressed at the time when performing a shutter operation of the imaging apparatus 102, and the operation object 334 is an operation object pressed at the time when performing a shutter operation of the imaging apparatus 103.

That is, in the case where performing respective shutter operations of the plurality of imaging apparatuses, a pressing operation of the operation object 311 is performed, and in the case where performing a shutter operation of a part from among the plurality of imaging apparatuses, pressing operations of the operation objects 331 through to 334 are performed.

[Example where a Live View Image of a Part of the Imaging Apparatuses is Displayed Enlarged]

A display example (display screen 340) is shown in b of FIG. 11 of the case where a live view image of a part of the imaging apparatuses from among each of the imaging apparatuses connected to one information processing apparatus 200 is displayed enlarged. An example is shown in b of FIG. 11 where a live view image of an imaging apparatus mounted on the information processing apparatus 200 is displayed enlarged. Specifically, a display example is shown in b of FIG. 11 of the case where the imaging apparatus 100 is mounted on the information processing apparatus 200, such as shown in FIG. 10.

Live view image display regions 341 through to 344, which correspond to the 4 imaging apparatuses 100 through to 103 connected to the information processing apparatus 200, are displayed on the display screen 340. Here, the display screen 340 is different to the display screen 310 shown in a of FIG. 11, for the point of the size of the live view image display region 341 of the imaging apparatus 100 mounted on the information processing apparatus 200 is displayed enlarged so as to become larger than the size of the others. Further, the display screen 340 is different to the display screen 310 shown in a of FIG. 11, for the point of the size of the operation object 351, which corresponds to the imaging apparatus 100 mounted on the information processing apparatus 200, is displayed enlarged so as to become larger than the size of the others. Note that, other than the points for which the sizes of the live view image display region 341 and the operation object 351 are displayed enlarged, it is similar to the display screen 310 shown in a of FIG. 11.

That is, the live view image display regions 341 through to 344 correspond to the live view image display regions 321 through to 324 shown in a of FIG. 11, and the operation objects 351 through to 354 correspond to the operation objects 331 through to 334 shown in a of FIG. 11.

In this way, by displaying the size of the live view image display region 341 of the imaging apparatus 100 mounted on the information processing apparatus 200 enlarged, a user 400 (shown in FIG. 10) can easily comprehend a live view image of the imaging apparatus 100. Further, since the operation object 351 is displayed enlarged, a shutter operation of the imaging apparatus 100 can be easily performed.

Note that, while an example is shown in FIG. 11 where an operation object pressed at the time when instructing a recording operation of an image to an imaging apparatus is displayed for each imaging apparatus, other operation objects may be similarly displayed for each of the imaging apparatuses. Further, other operation objects related to each of the imaging apparatuses may be displayed.

[Operation Example of the Information Processing Apparatus]

Figure 12:
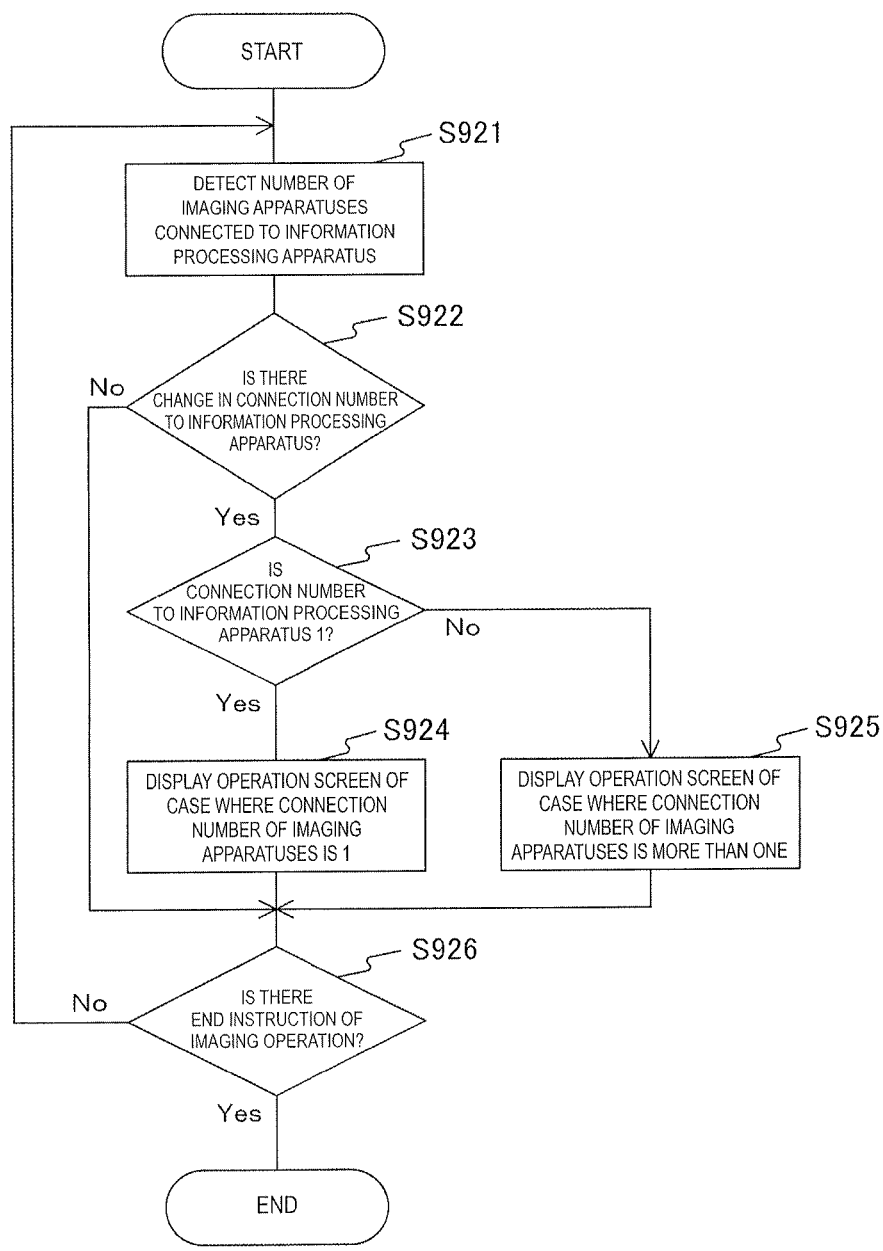
FIG. 12 is a flow chart which shows an example of a process procedure of a display control process by the information processing apparatus 200 in a second embodiment of the present technology.

FIG. 12 is a flow chart which shows an example of a process procedure of a display control process by the information processing apparatus 200 in the second embodiment of the present technology.

First, the control unit 250 detects the number (connection number) of imaging apparatuses connected to the information processing apparatus 200 by using wireless communication (step S921). This detection method of the connection number can use any of the above described methods.

To continue, the control unit 250 decides whether or not a change has occurred in the connection number to the information processing apparatus 200 (step S922). Here, the case where a change has occurred in the connection number means, for example, the case where the connection number has increased, or the case where the connection number has decreased. Then, in the case where a change has not occurred in the connection number (step S922), it proceeds to step S926.

Further, in the case where a change has occurred in the connection number (step S922), the control unit 250 decides whether or not the connection number after this change is 1 (step S923). Then, in the case where the connection number after this change is 1 (step S923), the control unit 250 causes a display screen of the case where the connection number is 1 to be displayed in the input-output unit 240 (step S924). For example, the display screen shown in FIG. 6 is displayed in the input-output unit 240.

In the case where the connection number after this change is not 1 (in the case of 2 or more) (step S923), the control unit 250 causes a display screen of the case where the connection number is more than one to be displayed in the input-output unit 240 (step S925). For example, the display screen 310 shown in a of FIG. 11 is displayed in the input-output unit 240.

To continue, the control unit 250 decides whether or not there is an end instruction of the imaging operation (step S926), and in the case where there is no end instruction of the imaging operation, it returns to step S921, and in the case where there is an end instruction of the imaging operation, the operation of the display control process ends.

[Operation Example of the Information Processing Apparatus]

Figure 13:
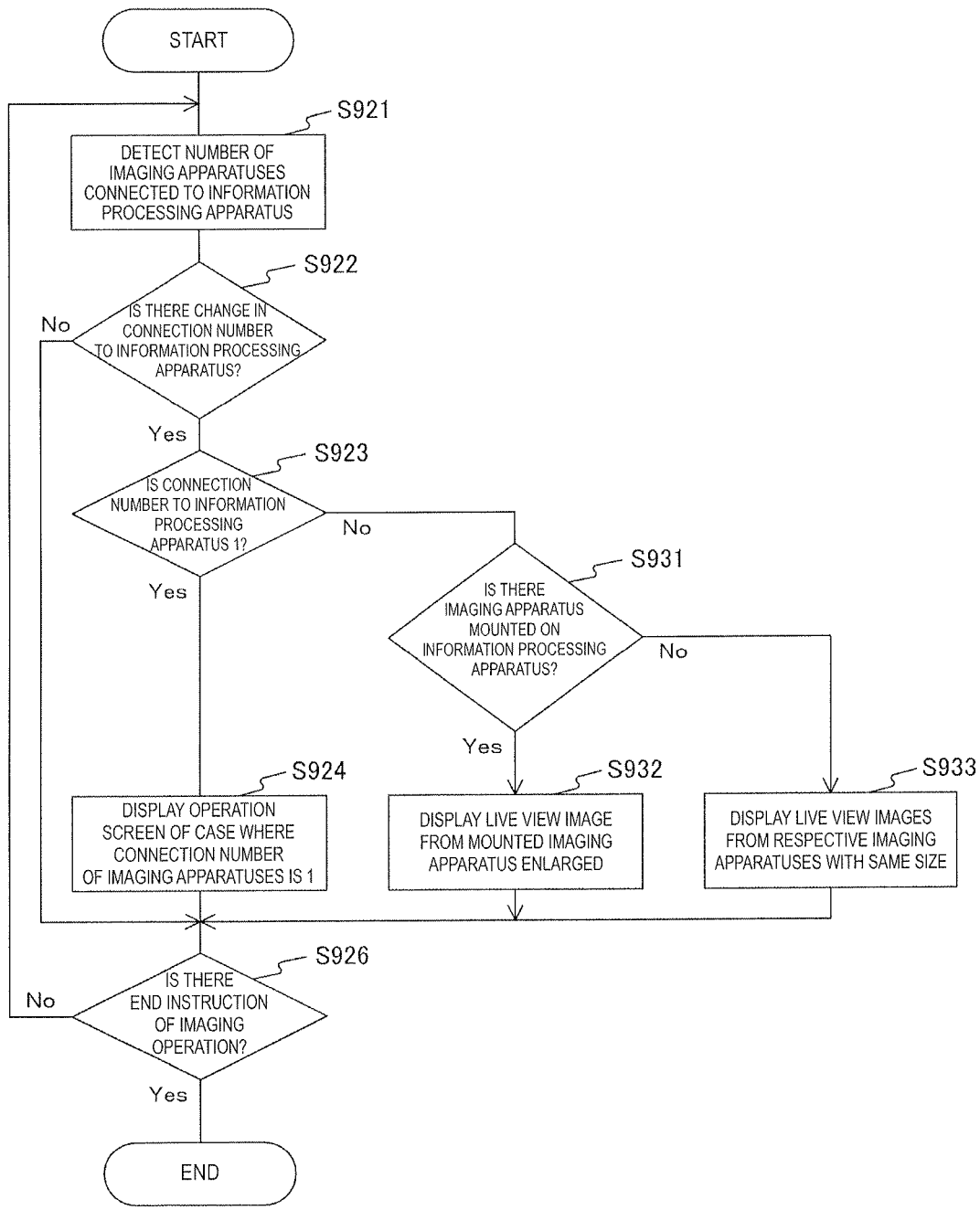
FIG. 13 is a flow chart which shows an example of a process procedure of a display control process by the information processing apparatus 200 in a second embodiment of the present technology.

FIG. 13 is a flow chart which shows an example of a process procedure of a display control process by the information processing apparatus 200 in the second embodiment of the present technology. An example is shown in FIG. 13 of the case where a live view image of a part of the imaging apparatuses from among each of the imaging apparatuses connected to one information processing apparatus 200 is displayed enlarged. Note that, FIG. 13 modifies a part of the process procedure shown in FIG. 12. Accordingly, a part of these descriptions will be omitted, for the portions in common with FIG. 12, by attaching the same reference numerals.

In the case where a change has occurred in the connection number to the information processing apparatus 200 (step S922), and the connection number after this change more than one (step S923), the control unit 250 decides whether or not an imaging apparatus mounted on the information processing apparatus 200 is present (step S931).

In the case where an imaging apparatus mounted on the information processing apparatus 200 is present (step S931), the control unit 250 causes a display screen, on which a live view image of the imaging apparatus mounted on the information processing apparatus 200 is enlarged, to be displayed in the input-output unit 240 (step S932). For example, the display screen 340 shown in b of FIG. 11 is displayed in the input-output unit 240.

In the case where an imaging apparatus mounted on the information processing apparatus 200 is not present (step S931), the control unit 250 causes a display screen, on which live view images of the respective imaging apparatuses connected to the information processing apparatus 200 are set to the same size, to be displayed in the input-output unit 240 (step S933). For example, the display screen 310 shown in a of FIG. 11 is displayed in the input-output unit 240.

[Operation Example of the Information Processing Apparatus]

Figure 14:
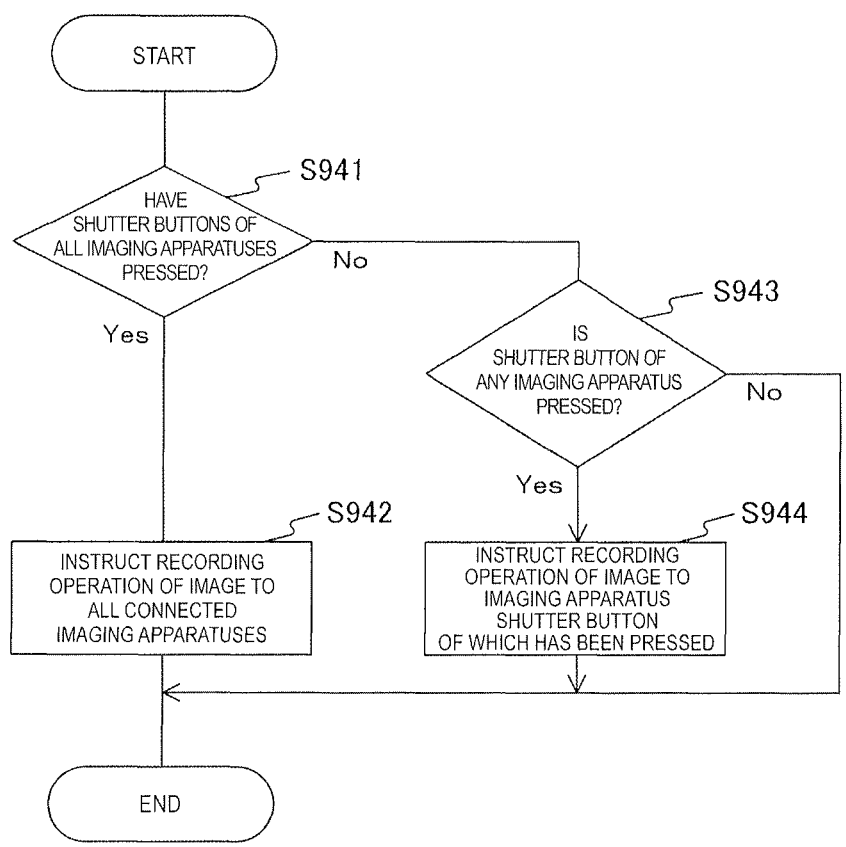
FIG. 14 is a flow chart which shows an example of a process procedure of a recording operation instruction process of an image by the information processing apparatus 200 in a second embodiment of the present technology.

FIG. 14 is a flow chart which shows an example of a process procedure of a recording operation instruction process of an image by the information processing apparatus 200 in the second embodiment of the present technology. An example is shown in FIG. 14 of a process procedure of the case where a plurality of imaging apparatuses are connected to the information processing apparatus 200, and a display screen of the case where the connection number is more than one (for example, the display screen 310 shown in a of FIG. 11) is displayed in the input-output unit 240.

First, the control unit 250 decides whether or not an operation input for instructing a recording operation of an image has been performed for all of the plurality of imaging apparatuses connected to the information processing apparatus 200 (step S941). For example, it is decided whether or not a pressing operation of the operation object 311 shown in a of FIG. 11 has been performed (step S941).

In the case where an operation input for instructing a recording operation of an image has been performed for all of the plurality of imaging apparatuses (step S941), the control unit 250 instructs a recording operation of an image to all of the imaging apparatuses connected to the information processing apparatus 200 (step S942). For example, the control unit 250 transmits control information for instructing a recording operation of an image, via the wireless communication units 230 and 150, to all of the imaging apparatuses connected to the information processing apparatus 200. Each of the imaging apparatuses receiving this control information performs a recording process of an image by controlling each of the units based on this received control information.

In the case where this operation input is not performed (step S941), the control unit 250 decides whether or not an operation input for instructing a recording operation of an image has been performed in a part from among the plurality of imaging apparatuses connected to the information processing apparatus 200 (step S943). For example, it is decided whether or not a pressing operation of at least one from among the operation objects 331 through to 334 shown in a of FIG. 11 has been performed (step S943).

In the case where an operation input for instructing a recording operation of an image has been performed in a part from among the plurality of imaging apparatuses (step S943), the control unit 250 instructs a recording operation of an image to the imaging apparatus for which this operation input has been performed (step S944). For example, the control unit 250 transmits control information for instructing a recording operation of an image, via the wireless communication units 230 and 150, to the imaging apparatus for which this operation input has been performed. The imaging apparatus receiving this control information performs a recording process of an image by controlling each of the units based on this received control information.

In this way, the control unit 250 of the information processing apparatus 200 performs a control for switching a display state of a display screen based on the number of imaging apparatuses connected to the information processing apparatus 200 by using wireless communication. In this case, in the case where only one imaging apparatus is connected to the information processing apparatus 200, the control unit 250 causes a display screen which includes an image generated by this imaging apparatus (a live view image) and operation objects for operating this imaging apparatus to be displayed in the input-output unit 240. On the other hand, in the case where a plurality of imaging apparatuses are connected to the information processing apparatus 200, the control unit 250 causes a display screen of the case where the connection number is more than one to be displayed in the input-output unit 240. This display screen of the case where the connection number is more than one is a display screen which includes an image generated by each of the plurality of imaging apparatuses, an operation object for simultaneously operating the plurality of imaging apparatuses, and an operation object for operating each of the plurality of imaging apparatuses.

Further, in the case where an imaging apparatus mounted on the information processing apparatus 200 is present from among the plurality of imaging apparatuses connected to the information processing apparatus 200, the control unit 250 can perform a control for causing an image generated by this imaging apparatus to be displayed enlarged.

In this way, according to the embodiments of the present technology, an appropriate user interface corresponding to a use state of an imaging apparatus and an information processing apparatus can be provided.

Note that, in the first embodiment of the present technology, an example has been shown where one imaging apparatus and a plurality of information processing apparatuses are connected, and in the second embodiment of the present technology, an example has been shown where a plurality of imaging apparatuses and one information processing apparatus are connected. However, the embodiments of the present technology can also be applied to the case where a plurality of imaging apparatus and a plurality of information processing apparatuses are connected.

Further, in the embodiments of the present technology, while an example has been described where a display screen for performing a recording operation of a still image is displayed, the embodiments of the present technology can also be applied to the case where a display screen for performing a recording operation of a moving image is displayed.

Further, in the embodiments of the present technology, while cylindrical (columnar shaped) imaging apparatuses 100 through to 103 have been described as an example, the embodiments of the present technology can also be applied to an imaging apparatus with another shape capable of being attached to another apparatus. Further, in the embodiments of the present technology, while information processing apparatuses 200 through to 203 such as a smartphone or a tablet terminal have been described, the embodiments of the present technology can also be applied to another apparatus capable of connecting to an imaging apparatus by using wireless communication.

Note that, the above-described embodiments show examples for embodying the present technology, and the matters in the embodiments have a corresponding relationship with invention-specific matters in the claims. Similarly, the invention-specific matters in the claims, and the matters in the embodiments of the present technology to which the same names as these are attached, have a corresponding relationship with each other. However, the present technology is not limited to the embodiments, and various modifications of the embodiments may be embodied in the scope of the present technology without departing from the spirit of the present technology.

Further, the above described process procedures described in the embodiments may be handled as a method having this series of procedures, or may be handled as a program for causing a computer to execute this series of procedures and a recording medium storing this program. A Compact Disc (CD), a MiniDisc (MD), a Digital Versatile Disc (DVD), a memory card, a Blu-ray (registered trademark) Disc or the like can be used, for example, as this recording medium.

Note that, the effect described herein is not limited to that illustrated, and there may be additional effects.

Additionally, the present technology may also be configured as below.

(1)

An information processing apparatus, including:

a control unit which performs a control for switching a display state of a display screen related to an imaging operation of an imaging apparatus based on a connection number of imaging apparatuses and information processing apparatuses connected by using wireless communication.

(2)

The information processing apparatus according to (1), wherein the control unit performs a control for switching a display state of the display screen based on a number of information processing apparatuses connected to the imaging apparatus by using wireless communication.

(3)

The information processing apparatus according to (2), wherein the control unit performs a control, in the case where only the information processing apparatus is connected to the imaging apparatus, for causing the display screen for operating the imaging apparatus to be displayed, and in the case where another information processing apparatus other than the information processing apparatus is connected to the imaging apparatus, for causing the display screen corresponding to a presence or absence of an operation right for operating the imaging apparatus to be displayed.

(4)
The information processing apparatus according to (3), wherein, in the case where the information processing apparatus and the other information processing apparatus are connected to the imaging apparatus, the control unit performs a control for causing the display screen which includes an image generated by the imaging apparatus and an operation object for operating the imaging apparatus to be displayed, at the time when the information processing apparatus has the operation right, and for causing the display screen which includes an image generated by the imaging apparatus to be displayed, at the time when the information processing apparatus does not have the operation right.

(5)
The information processing apparatus according to (1), wherein the control unit performs a control for switching a display state of the display screen based on a number of imaging apparatuses connected to the information processing apparatus by using wireless communication.

(6)
The information processing apparatus according to (5), wherein the control unit performs a control, in the case where only one imaging apparatus is connected to the information processing apparatus, for causing the display screen which includes an image generated by the imaging apparatus and an operation object for operating the imaging apparatus to be displayed, and in the case where a plurality of imaging apparatuses are connected to the information processing apparatus, for causing the display screen which includes an image generated by each of the plurality of imaging apparatuses, an operation object for simultaneously operating the plurality of imaging apparatuses, and an operation object for operating each of the plurality of imaging apparatuses, to be displayed.

(7)
The information processing apparatus according to (6), wherein the control unit performs a control, in the case where an imaging apparatus mounted on the information processing apparatus is present from among the plurality of imaging apparatuses connected to the information processing apparatus, for causing an image generated by the imaging apparatus to be displayed enlarged.

(8)
An imaging apparatus, including:
a control unit which performs a control related to an imaging operation based on an operation input using a display screen performed in an information processing apparatus in which the display screen is displayed for a display state to be switched based on a connection number of imaging apparatuses and information processing apparatuses connected by using wireless communication.

(9)
The imaging apparatus according to (8), wherein a display state of the display screen is switched based on a number of information processing apparatuses connected to the imaging apparatus by using wireless communication.

(10)
The imaging apparatus according to (9), wherein, in the case where only one information processing apparatus is connected to the imaging apparatus, the display screen for operating the imaging apparatus is displayed in the information processing apparatus, and in the case where a plurality of information processing apparatuses are connected to the imaging apparatus, the display screen corresponding to a presence or absence of an operation right for operating the imaging apparatus is displayed in each of the plurality of information processing apparatuses.

(11)
The imaging apparatus according to (10), wherein, in the case where the plurality of information processing apparatuses are connected to the imaging apparatus, the display screen which includes an image generated by the imaging apparatus and an operation object for operating the imaging apparatus is displayed in an information processing apparatus having the operation right, and the display screen which includes an image generated by the imaging apparatus is displayed in an information processing apparatus not having the operation right.

(12)
The imaging apparatus according to (8), wherein a display state of the display screen is switched based on a number of imaging apparatuses connected to the information processing apparatus by using wireless communication.

(13)
The imaging apparatus according to (12), wherein, in the case where only one imaging apparatus is connected to the information processing apparatus, the display screen which includes an image generated by the imaging apparatus and an operation object for operating the imaging apparatus is displayed in the information processing apparatus, and in the case where a plurality of imaging apparatuses are connected to the information processing apparatus, the display screen which includes an image generated by each of the plurality of imaging apparatuses, an operation object for simultaneously operating the plurality of imaging apparatuses, and an operation object for operating each of the plurality of imaging apparatuses, is displayed in the information processing apparatus.

(14)
The imaging apparatus according to (13), wherein, in the case where an imaging apparatus mounted on the information processing apparatus is present from among the plurality of imaging apparatuses connected to the information processing apparatus, an image generated by the imaging apparatus is displayed enlarged.

(15)
An imaging system, including:
an imaging apparatus in which a control related to an imaging operation is performed based on an operation input performed in an information processing apparatus by connecting to the information processing apparatus by using wireless communication; and
an information processing apparatus which performs a control for switching a display state of a display screen related to an imaging operation of the imaging apparatus based on a connection number of the imaging apparatuses and the information processing apparatuses connected by using wireless communication.

(16)
A control method of an information processing apparatus which performs a control for switching a display state of a display screen related to an imaging operation of an imaging apparatus based on a connection number of imaging apparatuses and information processing apparatuses connected by using wireless communication.

(17)

A control method of an imaging apparatus which performs a control related to an imaging operation based on an operation input using a display screen performed in an information processing apparatus in which the display screen is displayed for a display state to be switched based on a connection number of imaging apparatuses and information processing apparatuses connected by using wireless communication.

(18)

A program for causing a computer to execute a control for switching a display state of a display screen related to an imaging operation of an imaging apparatus based on a connection number of imaging apparatuses and information processing apparatuses connected by using wireless communication.

(19)

A program for causing a computer to execute a control related to an imaging operation based on an operation input using a display screen performed in an information processing apparatus in which the display screen is displayed for a display state to be switched based on a connection number of imaging apparatuses and information processing apparatuses connected by using wireless communication.

REFERENCE SIGNS LIST 100 to 103 imaging apparatus
110 imaging unit
120 image processing unit
130 storage unit
140 control unit
150 wireless communication unit
160 lens barrel
171, 172 attachment member
200 to 203 information processing apparatus
210 posture detection unit
220 operation reception unit
221 to 223 operation member
230 wireless communication unit
240 input-output unit
241 input unit
242 display unit
250 control unit
260 image processing unit
270 storage unit
280 voice output unit
291 light emitting unit
292 imaging unit

The invention claimed is:

1. An information processing apparatus comprising:
communication circuitry that is electrically connectable with one or more imaging apparatuses in a manner that permits the communication circuitry to communicate electronically with any of the imaging apparatuses; and
a controller that is electrically connected to the communication circuitry in a manner that permits the controller to:
determine whether or not the information processing apparatus has a live view right for each of the imaging apparatuses,
detect a total quantity of the imaging apparatuses with the live view right, and
cause a display screen to switch, from a first display state to a second display state when the controller decides that the total quantity has changed, a display state of a display screen related to imaging operations of the imaging apparatuses,
determine whether the information processing apparatus has an operation right for each of the imaging apparatuses,
in response to determining that the information processing apparatus has the live view right for each of the imaging apparatuses and has the operation right for each of the imaging apparatuses, cause the display screen to display a first operation object for operating a corresponding imaging apparatus with the operation right, and
in response to determining that the information processing apparatus has the live view right for each of the imaging apparatuses and does not have the operation right for any of the imaging apparatuses, inhibit display of the first operation object,
wherein the live view right is a right which displays, as a live view image, images generated by the imaging apparatuses, and
the first operation object is displayed adjacent to the live view image generated by the corresponding imaging apparatus with the operation right.

2. The information processing apparatus according to claim 1, wherein the operation right is a right which operates each of the imaging apparatuses by the information processing apparatus.

3. The information processing apparatus according to claim 1, wherein the controller is further configured to cause the display screen to simultaneously display the images generated by the imaging apparatuses when the total quantity is greater than one.

4. The information processing apparatus according to claim 1, wherein the controller is further configured to cause the display screen to display a second operation object for operating all the imaging apparatuses with the operation right from the imaging apparatuses with live view right.

5. The information processing apparatus according to claim 1, wherein the first operation object is superimposed on the image generated by corresponding imaging apparatus.

6. An imaging system comprising:
the information processing apparatus according to claim 1; and
the one or more imaging apparatuses.

7. The information processing apparatus of claim 1, wherein the controller is further configured to:
perform a control, in the case where an imaging apparatus is mounted on the information processing apparatus is present from among the imagining apparatuses, for causing the display screen to display live view image generated by the mounted imaging apparatus to be displayed enlarged so as to become larger than one or more live view images generated by one or more imaging apparatuses which are not mounted.

* * * * *